(12) United States Patent
Oh et al.

(10) Patent No.: US 11,979,917 B2
(45) Date of Patent: May 7, 2024

(54) METHOD AND DEVICE FOR TRANSMITTING AND RECEIVING NON-ORTHOGONAL MULTIPLE ACCESS SIGNALS IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Jinkyu Kang, Gyeonggi-do (KR); Taehyoung Kim, Gyeonggi-do (KR); Youngbum Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 468 days.

(21) Appl. No.: 17/290,404

(22) PCT Filed: Oct. 29, 2019

(86) PCT No.: PCT/KR2019/014324
§ 371 (c)(1),
(2) Date: Apr. 30, 2021

(87) PCT Pub. No.: WO2020/091363
PCT Pub. Date: May 7, 2020

(65) Prior Publication Data
US 2021/0360705 A1    Nov. 18, 2021

(30) Foreign Application Priority Data

Nov. 2, 2018    (KR) .................. 10-2018-0133410

(51) Int. Cl.
*H04W 74/0833* (2024.01)
*H04W 76/20* (2018.01)
*H04W 76/30* (2018.01)

(52) U.S. Cl.
CPC ....... *H04W 74/0841* (2013.01); *H04W 76/20* (2018.02); *H04W 76/30* (2018.02)

(58) Field of Classification Search
CPC .. H04W 74/0841; H04W 76/20; H04W 76/30
See application file for complete search history.

(56) References Cited

U.S. PATENT DOCUMENTS

2009/0257407 A1    10/2009   Park et al.
2018/0124626 A1*    5/2018   Tsai .................... H04L 25/0202
(Continued)

FOREIGN PATENT DOCUMENTS

| KR | 1020140116435 | 10/2014 |
| KR | 1020180035719 | 4/2018 |
| KR | 1020180096764 | 8/2018 |

OTHER PUBLICATIONS

KDDI, "Discussion on Procedures Related to NOMA", R1-1811486, 3GPP TSG RAN WG1 Meeting #94bis, Oct. 8-12, 2018, 5 pages.
(Continued)

*Primary Examiner* — Elton Williams
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method for more efficiently transmitting uplink control information and data in a mobile communication system operating in an unlicensed band or in
(Continued)

a mobile communication system requiring a channel sensing operation.

12 Claims, 18 Drawing Sheets

(56) References Cited

U.S. PATENT DOCUMENTS

2018/0234948 A1 8/2018 Ren et al.
2018/0310206 A1 10/2018 Li et al.
2021/0067994 A1* 3/2021 Chen .................... H04W 48/12

OTHER PUBLICATIONS

InterDigital, "2-Step RACH Procedure", R2-1814008, 3GPP TSG-RAN WG2 Meeting #103bis, Oct. 8-12, 2018, 5 pages.
Korean Office Action dated Mar. 3, 2023 issued in counterpart application No. 10-2018-0133410, 9 pages.
PCT/ISA/210 Search Report issued on PCT/KR2019/014324, Feb. 28, 2020, pp. 7.
PCT/ISA/237 Written Opinion issued on PCT/KR2019/014324, Feb. 28, 2020, pp. 4.
Yuan, Yifei, "5G Non-Orthogonal Multiple Access Study", IEEE Wireless Communications, Oct. 2018, pp. 4.

* cited by examiner

METHOD AND DEVICE FOR TRANSMITTING AND RECEIVING NON-ORTHOGONAL MULTIPLE ACCESS SIGNALS IN WIRELESS COMMUNICATION SYSTEM

PRIORITY

This application is a National Phase Entry of PCT International Application No. PCT/KR2019/014324, which was filed on Oct. 29, 2019, and claims priority to Korean Patent Application No. 10-2018-0133410, which was filed on Nov. 2, 2018, the content of each of which is incorporated herein by reference.

TECHNICAL FIELD

The disclosure relates to a method for transmitting and receiving a signal in a wireless communication system. In addition, the disclosure relates to a method for transmitting and receiving a signal for supporting non-orthogonal multiple access (NOMA) in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to efficiently provide these services.

DISCLOSURE OF INVENTION

Technical Problem

A technical problem to be solved by various embodiments of the disclosure is to provide a method and a device for transmitting and receiving signals in a wireless communication system. In addition, another technical problem to be solved by various embodiments of the disclosure is to provide a method and a device for transmitting and receiving signals such that non-orthogonal multiple access (NOMA) is supported.

Solution to Problem

The disclosure may provide an operation method of a terminal, the operation method including: receiving a radio resource control (RRC) release message including a configuration related to an RRC inactive; identifying a transmission resource for data transmission, based on an RRC connection resume request; transmitting data and a random access preamble, based on the transmission resource; and receiving a random access response corresponding to the random access preamble, wherein the transmission resource is determined based on first information included in the configuration related to the RRC inactive and second information related to resource identification.

In addition, the disclosure may provide a terminal including: a transceiver; and a controller connected to the transceiver and configured to control to receive a radio resource control (RRC) release message including a configuration related to an RRC inactive, identify a transmission resource for data transmission, based on an RRC connection resume request, transmit data and a random access preamble, based on the transmission resource, and receive a random access response corresponding to the random access preamble, wherein the transmission resource is determined based on first information included in the configuration related to the RRC inactive and second information related to resource identification.

In addition, the disclosure may provide an operation method of a base station, the operation method including: receiving a random access preamble and data from a terminal; and transmitting a random access response to the terminal, based on the reception of the random access preamble, wherein a transmission resource for transmission of the data is determined based on first information included in a configuration related to a radio resource control (RRC) inactive of an RRC release message and second information related to resource identification.

In addition, the disclosure may provide a base station including: a transceiver; and a controller connected to the transceiver and configured to control to receive a random access preamble and data from a terminal, and transmit a random access response to the terminal, based on the reception of the random access preamble, wherein a transmission resource for transmission of the data is determined based on first information included in a configuration of a radio resource control (RRC) inactive of an RRC release message and second information related to resource identification.

Technical problems to be solved by embodiments of the disclosure are not limited to the above-mentioned technical problems, and other technical problems not mentioned herein could be clearly understood, from the following description, by those skilled in the art to which the disclosure pertains.

Advantageous Effects of Invention

According to various embodiments of the disclosure, a method and a device for transmitting/receiving signals in a wireless communication system may be provided.

In addition, according to various embodiments of the disclosure, a method and a device for transmitting/receiving non-orthogonal multiple access signals in a wireless communication system may be provided.

In addition, various embodiments of the disclosure may propose an uplink control information transmitting/receiving method such that resources allocated to transmit a non-orthogonal multiple access uplink data channel can be efficiently utilized.

MODE FOR THE INVENTION

Figure 1:
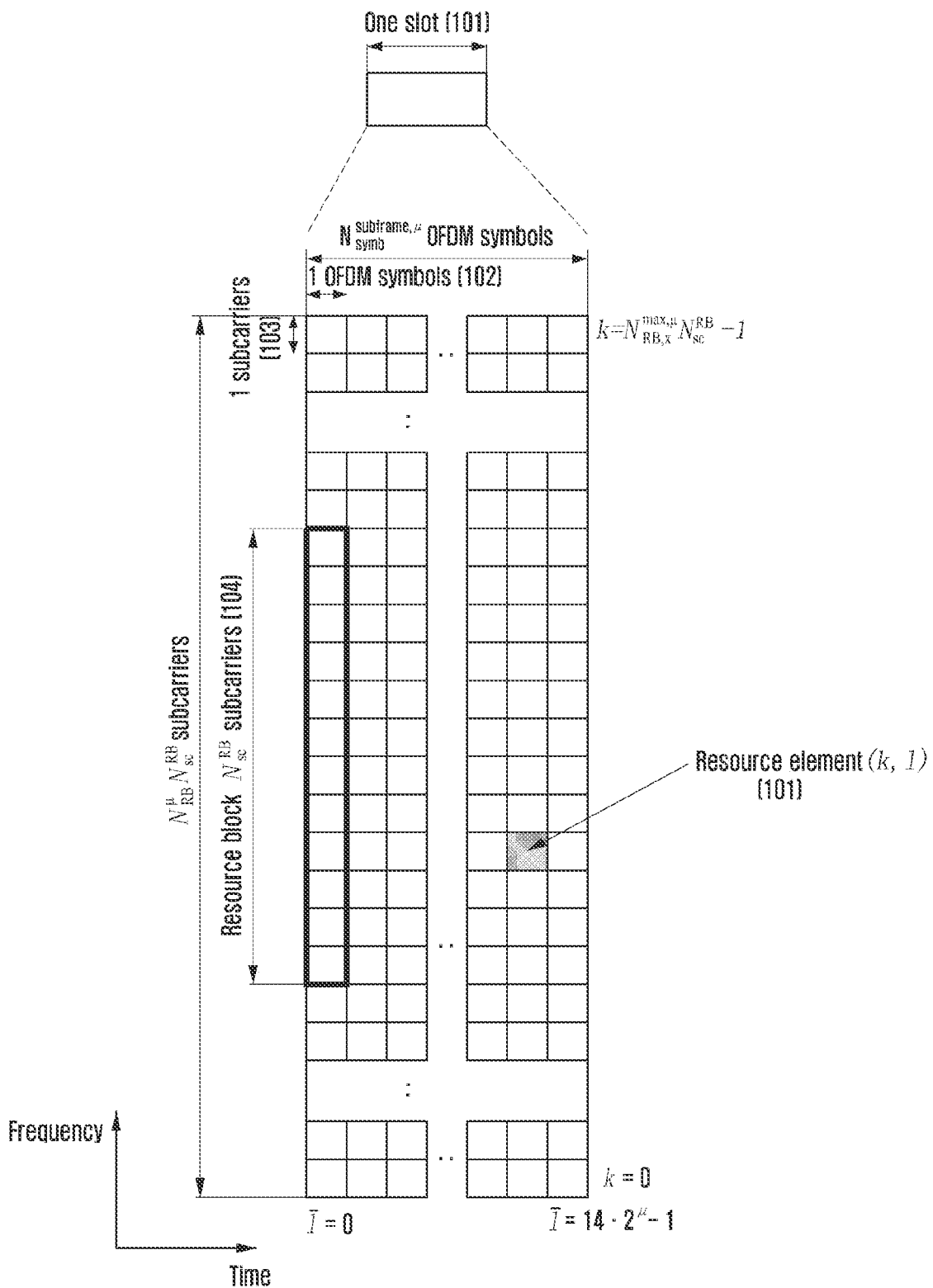
FIG. 1 illustrates a basic structure of a time-frequency domain which is a radio resource region in which data or a control channel is transmitted in a 5G system according to the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is an entity that performs resource allocation for a terminal and may be at least one of a gNode B, an eNode B, a Node B, a base station (BS), a radio access unit, a base station controller, or a node on a network. The terminal may include a user equipment (UE), a mobile station (MS), a cellular phone, a smartphone, a computer, or a multimedia system capable of performing a communication function. In the disclosure, a downlink (DL) is a radio transmission path of a signal which is transmitted from the base station to the terminal, and an uplink (UL) means a radio transmission path of a signal which is transmitted from the terminal to the base station. In addition, an LTE or LTE-A system may be described below as an example, but an embodiment of the disclosure may be applied to other communication systems having a similar technical background or channel type. For example, a $5^{th}$ generation mobile communication technology (5G, new radio, or NR) developed after LTE-A may be included in systems to which an embodiment may be applied, and 5G described below may be a concept including the existing LTE, LTE-A, and other similar services. Further, according to the determination of a person skilled in the art, the disclosure may be applied to other communication systems through partial modification without greatly departing from the scope of the disclosure.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has developed to be a broadband wireless communication system that provides a high speed and high quality packet data service, like the communication standards, for example, high speed packet access (HSPA), long term evolution (LTE or evolved universal terrestrial radio access (E-UTRA)), LTE-advanced (LTE-A), and LTE-Pro of 3GPP, high rate packet data (HRPD) and ultra mobile broadband (UMB) of 3GPP2, 802.16e of IEEE, and the like, beyond the voice-based service provided at the initial stage.

As a representative example of a broadband wireless communication system, an LTE system employs an orthogonal frequency division multiplexing (OFDM) scheme for a downlink (DL) and employs a single carrier frequency division multiple access (SC-FDMA) scheme for an uplink (UL). The uplink refers to a radio link for transmitting data or a control signal by a terminal (user equipment (UE) or mobile station (MS)) to a base station (eNode B or base station (BS)), and the downlink refers to a radio link for transmitting data or a control signal by a base station to a terminal. Further, in the multiple access schemes described above, time-frequency resources for carrying data or control information are allocated and managed in a manner to prevent overlapping of the resources between users, i.e., to establish the orthogonality, so as to identify data or control information of each user.

A post-LTE communication system, that is, a 5G communication system is required to freely reflect various requirements from a user, a service provider, and the like, and is thus required to support services satisfying various requirements. Services considered for a 5G communication system include enhanced mobile broadband (eMBB) communication, massive machine-type communication (mMTC), ultra-reliability and low-latency communication (URLLC), and the like.

The eMBB is intended to provide a further enhanced data transmission rate than that supported by the existing LTE, LTE-A, or LTE-Pro. For example, in a 5G communication system, the eMBB is required to provide a peak data rate of 20 Gbps in a downlink and a peak data rate of 10 Gbps in an uplink in view of one base station. In addition, the 5G communication system is required to provide the peak data rates and an increased user perceived data rate of a terminal. In order to meet the requirements described above, the 5G communication system requires the improvement of various transmission and reception technologies including a further enhanced multi input multi output (MIMO) transmission technology. In addition, while LTE uses, for the transmission of a signal, a maximum transmission bandwidth of 20 MHz in a band of 2 GHz used by the LTE, the 5G communication system uses a frequency bandwidth greater than 20 MHz in a frequency band of 3 to 6 GHz or a frequency band of 6 GHz or greater to satisfy a data transmission rate required for the 5G communication system.

In a 5G communication system, mMTC has been considered to support application services, such as the Internet of Things (IoT). In order to efficiently provide IoT, mMTC may require support for access of a great number of terminals in a cell, enhanced terminal coverage, increased battery time, reduced terminal cost, and the like. Since the IoT is mounted in various sensors and various devices to provide a communication function, mMTC is required to support a large number of terminals (for example, 1,000,000 terminals/km$^2$) in a cell. In addition, a terminal supporting mMTC requires a wider coverage compared to other services provided in a 5G communication system since the terminal is highly probable to be located in a radio shadow area that a cell cannot cover, such as the basement of a building, due to the nature of the service. The terminal supporting mMTC is required to be inexpensive, and have a very long battery lifetime like 10-15 years since it is hard to often change a battery of the terminal.

Lastly, URLLC is a cellular-based wireless communication service which is used for a particular purpose (mission-critical). For example, services used in remote control for a robot or machinery, industrial automation, an unmanned aerial vehicle, remote health care, emergency alert, etc. may be considered for URLLC. Therefore, communication provided by URLLC is required to provide ultra-low latency and ultra-high reliability. For example, a service supporting URLLC is required not only to satisfy a wireless access latency time (air interface latency) of less than 0.5 milliseconds but also to have a packet error rate of $10^{-5}$ or less. Therefore, for services supporting URLLC, a 5G system requires a design for providing a transmission time interval (TTI) shorter than those of other services and allocating a wide domain of resources in a frequency band to secure the reliability of a communication link.

Three services of 5G technology, that is, eMBB, URLLC, and mMTC may be multiplexed and then transmitted in a single system. In order to satisfy different requirements of the services, different transmission and reception schemes and different transmission and reception parameters may be used for the services, respectively.

Hereinafter, various embodiments of the disclosure will be described in detail with reference to the accompanying drawings. Hereinafter, various embodiments of the disclosure will be described by using a 5G wireless communication system as an example, but various embodiments of the disclosure may be applied to other communication systems having a similar technical background or channel type. Various embodiments of the disclosure may be applied not only to a 5G communication system but also to LTE and LTE-A or a communication system after 5G. Further, according to the determination of a person skilled in the art, various embodiments of the disclosure may be applied to other communication systems through partial modification without greatly departing from the scope of the disclosure.

In describing the disclosure, when it is determined that a detailed description of a related function or configuration may unnecessarily obscure the subject matter of the disclosure, a detailed description thereof will be omitted. In addition, terms to be described later are terms defined in consideration of functions in the disclosure, which may be changed according to the intention or practice of a user or an operator. Therefore, the definition should be made based on the contents throughout this specification.

Hereinafter, a frame structure of a 5G system will be described in detail with reference to the accompanying drawings.

FIG. 1 illustrates a basic structure of a time-frequency domain which is a radio resource region in which data or a control channel is transmitted in a 5G system according to the disclosure.

Referring to FIG. 1, a horizontal axis represents a time domain, and a vertical axis represents a frequency domain. The basic unit of a resource in the time-frequency domain is a resource element (RE) 101, which may be defined by one orthogonal frequency division multiplexing (OFDM) symbol 102 on the time axis and one subcarrier 103 on the frequency axis. In the frequency domain, $N_{sc}^{RE}$ (for example, 12) consecutive REs may configure one resource block (RB) 104. In addition, in the time domain, $N_{symb}^{subframe}$ consecutive OFDM symbols may configure one subframe 110.

Figure 2:
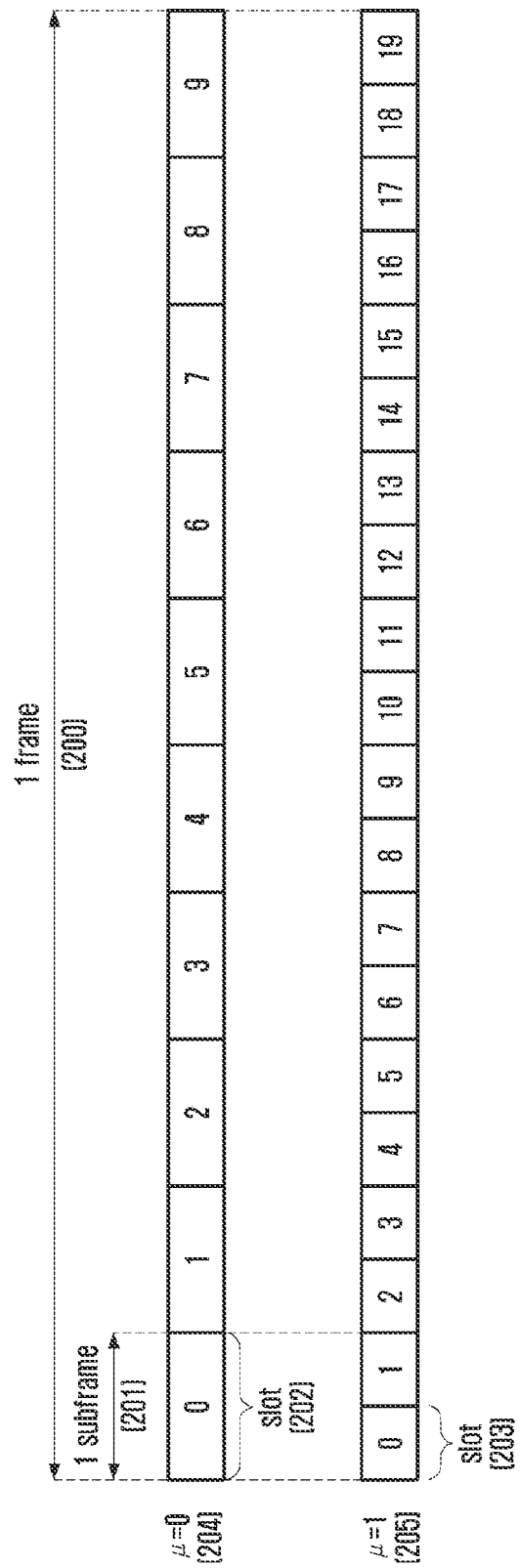
FIG. 2 illustrates a slot structure considered in a 5G system according to the disclosure.

FIG. 2 illustrates a slot structure considered in a 5G system according to the disclosure.

FIG. 2 illustrates an example of structures of a frame 200, a subframe 201, and a slot 202. One frame 200 may be defined as 10 ms. One subframe 201 may be defined as 1 ms, and thus, one frame 200 may include a total of 10 subframes 201. One slot 202 or 203 may be defined as 14 OFDM symbols (that is, the number of symbols per slot $N_{symb}^{slot}=14$). One subframe 201 may include one or a plurality of slots 202 and 203, and the number of slots 202 or 203 per subframe 201 may be changed according to configuration value μ (reference numeral 204 or 205) for subcarrier spacing. The example of FIG. 2 illustrates slot structures in the case of μ=0 (reference numeral 204) and in the case of μ=1 (reference numeral 205) as a subcarrier spacing configuration value. In the case of μ=0 (reference numeral 204), one subframe 201 may include one slot 202, and in the case of μ=1 (reference numeral 205), one subframe 201 may include two slots 203. That is, the number of slots per subframe $N_{slot}^{subframe,a}$ may be changed according to configuration value μ for subcarrier spacing, and accordingly, the number of slots per frame $N_{slot}^{frame,\mu}$ may be changed. $N_{slot}^{subframe,\mu}$ and $N_{slot}^{subframe,\mu}$ according to each subcarrier spacing configuration μ may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 37 |

Next, a method for transmitting an uplink data channel (physical uplink shared channel: PUSCH) in 5G will be described in detail.

A method for transmitting a PUSCH to a base station by a UE may be broadly divided into a grant-based transmission scheme and a non-approval (may be referred to as grant-free, configured grant, or configured scheduling)-based transmission scheme.

In the grant-based PUSCH transmission scheme, when traffic to be transmitted to the base station occurs, the UE may transmit a scheduling request message to the base station through a physical uplink control channel (PUCCH). In this case, the base station having received the scheduling request message may transmit, to the corresponding UE, downlink control information (DCI) for uplink scheduling corresponding to scheduling grant. The UE may receive the DCI for uplink scheduling through monitoring of a physical downlink control channel (PDCCH), and transmit a PUSCH to the base station, based on control information notified through the DCI.

In the grant-free-based PUSCH transmission scheme, the base station may configure a semi-static time/frequency resource in the UE through higher layer signaling or a higher layer message, for example, radio resource control (RRC) signaling or an RRC message. When traffic to be transmitted to the base station occurs, the UE may directly transmit a PUSCH without a grant of the base station in the configured time/frequency resource. The grant-free-based transmission scheme will be described in more detail later.

Next, a transmission structure for transmission of an uplink data channel (PUSCH) in 5G will be described.

Figure 3:
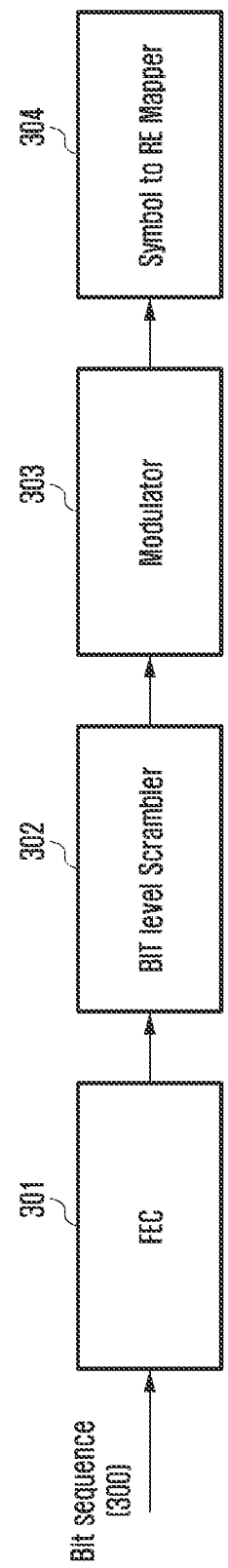
FIG. 3 is a diagram for explaining a structure of a transmitting terminal for transmitting an uplink data channel in 5G according to the disclosure.

FIG. 3 is a diagram for explaining a structure of a transmitting terminal for transmitting an uplink data channel in 5G according to the disclosure.

According to FIG. 3, a transmitting terminal for a PUSCH may include a forward error correction (FEC) 301, a bit-level scrambler 302, a modulator 303, and an RE mapper 304. The FEC 301 may perform a role of performing channel coding on an input bit sequence 300. In addition, the FEC 301 may perform a role of repetition of the input bit sequence.

The bit-level scrambler 302 may perform a scrambling operation relating to the bit sequence $b^{(q)}(0), \ldots, b^{(q)}(M_{bit}^{(q)}-1)$ of the total Mbit bits output through the FEC 301. For example, the bit-level scrambler 302 may follow the following procedure. The bit sequence $b^{(q)}(0), \ldots, b^{(q)}(M_{bit}^{(q)}-1)$ may be scrambled prior to modulation, and as a result thereof, the scrambled bit $\tilde{b}^{(q)}(0), \ldots, \tilde{b}^{(q)}(M_{bit}^{(q)}-1)$ may be obtained. $M_{bit}^{(q)}$ denotes the number of bits in codeword q.

The bit sequence $\tilde{b}^{(q)}(0), \ldots, \tilde{b}^{(q)}(M_{bit}^{(q)}-1)$ passed through the bit-level scrambler 302 may be output as $M_{symb}$ symbol sequences $d^{(q)}(0), \ldots, d^{(q)}(M_{bit}^{(q)}-1)$ modulated through the modulator 303. In 5G, modulation schemes according to the following modulation order are supported.

TABLE 3

| Transform precoding disabled | | Transform precoding enabled | |
|---|---|---|---|
| Modulation scheme | Modulation order $Q_m$ | Modulation scheme | Modulation order $Q_m$ |
| QPSK | 2 | π/2-BPSK | 1 |
| 16QAM | 4 | QPSK | 2 |
| 64QAM | 6 | 16QAM | 4 |
| 256QAM | 8 | 64QAM | 6 |
| | | 256QAM | 8 |

The modulated symbol sequence $d^{(q)}(0), \ldots, d^{(q)}(M_{bit}^{(q)}-1)$ passed through the modulator 303 may be mapped to time and frequency resources through a block of the symbol-to-RE mapper 304 and then transmitted.

According to Table 4 below, for each of antenna ports used for transmission of the PUSCH, the block of complex-valued symbols $z^{(p)}(0), \ldots, z^{(p)}(M_{symb}^{(ap)}-1)$ may be multiplied by the size scaling factor $\beta_{PUSCH}$ in order to conform to the transmission power specified in [5, TS 38.213], and mapped in sequence starting with $z^{(p)}(0)$ of $z^{(p)}(0), \ldots, z^{(p)}(M_{symb}^{(ap)}-1)$ to resource elements $(k',l)_{p,\mu}$ in the virtual resource blocks assigned for transmission which meet the following conditions: 1) they are required to be included in the virtual resource blocks assigned for transmission and 2) the corresponding resource elements in the corresponding physical resource blocks are not used for transmission of a demodulation reference signal (DMRS), phase-tracking reference signal (PT-RS), or DMRS for other co-scheduled UEs.

TABLE 2

The block of bits $b^{(q)}(0), \ldots, b^{(q)}(M_{bit}^{(q)}-1)$, where $M_{bit}^{(q)}$ is the number of bits in codeword q
transmitted on the physical channel, shall be scrambled prior to modulation, resulting in a
block of scrambled bits $\tilde{b}^{(q)}(0), \ldots, \tilde{b}^{(q)}(M_{bit}^{(q)}-1)$ according to the following pseudo code
Set i = 0
while i<$M_{bit}^{(q)}$
  if $b^{(q)}(i)$ = x // UCI placeholder bits
    $\tilde{b}^{(q)}(i)$ = 1
  else
    if $b^{(q)}(i)$ = y //UCI placeholder bits
      $\tilde{b}^{(q)}(i)=\tilde{b}(q)*i-1)$
    else
      $\tilde{b}^{(q)}(i)=(b^{(q)}(i)+c^{(q)}(i))\bmod 2$
    end if
  end if
  i = i + 1
end while
where x and y are tags defined in [4, TS, 38.212] and where the scrambling sequence $c^{(q)}(i)$
is given by clause 5.2.1. The scrambling sequence generator shall be initialized with
$C_{init} = n_{RNTI} \cdot 2^{15} + n_{ID}$
where
~ $n_{ID} \in \{0,1,\ldots,1023\}$ equals the higher-layer parameter dataScramblingIdentityPUSCHData-scrambling-Identity if configured and the RNTI equals the C-RNTI or CS-RNTI,
~ $n_{ID}=N_{ID}^{cell}$ otherwise
and where $n_{RNTI}$ corresponds to the RNTI associated with the PUSCH transmission as described in clause 6.1 of [6, TS 38.214].

TABLE 4

For each of the antenna ports used for transmission of the PUSCH, the block of complex-valued symbols $z^{(p)}(0),..., z^{(p)}(M_{symb}^{ap} - 1)$ shall be multiplied with the amplitude scaling factor $\beta_{PUSCH}$ in order to conform to the transmit power specified in [5, TS 38.213] and mapped in sequence starting with $z^{(p)}(0)$ to resource elements $(k', l)_{p,\mu}$ in the virtual resource blocks assigned for transmission which meet all of the following criteria:
- they are in the virtual resource blocks assigned for transmission, and
- the corresponding resource elements in the corresponding physical resource blocks are not used for transmission of the associated DM-RS, PT-RS, or DM-RS intended for other co-scheduled UEs as described in clause 6.4.1.1.3

The mapping to resource elements $(k', l)_{p,\mu}$ allocated for PUSCH according to [6, TS 38.214] shall be in increasing order of first the index k' over the assigned virtual resource blocks, where k' = 0 is the first subcarrier in the lowest-numbered virtual resource block assigned for transmission, and then the index l, with the starting position given by [6, TS 38.214].

---

In 5G, a structure of a transmitting terminal is not limited to the structure shown in FIG. 3, and such an operation may be performed by another structure.

Figure 4:
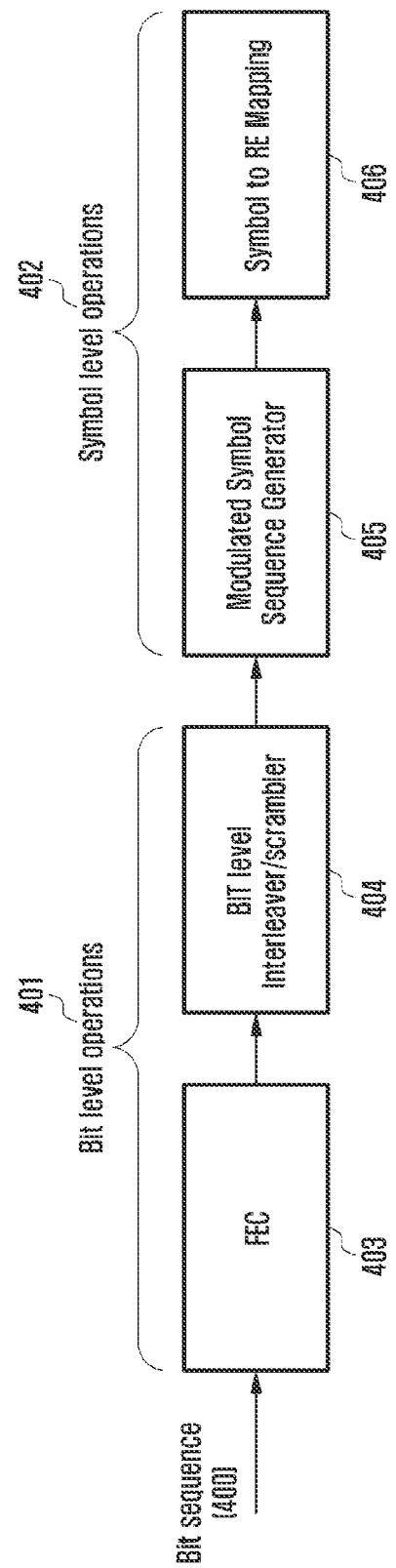
FIG. 4 illustrates a structure of a transmitting terminal in a non-orthogonal multiple access mode in 5G according to the disclosure.

Next, a transmission structure for PUSCH transmission based on NOMA in 5G will be described. FIG. 4 illustrates a structure of a transmitting terminal in a non-orthogonal multiple access mode in 5G according to the disclosure.

According to FIG. 4, an operation performed by a transmitting terminal for NOMA may include a bit-level operation 401 and a symbol-level operation 402.

A device for performing the bit-level operation 401 may include an FEC 403 and a bit-level interleaver/scrambler 404. The FEC 403 may perform a role of performing channel coding on an input bit sequence 400. In addition, the input bit sequence 400 may be repeated. The bit-level interleaver/scrambler 404 may perform interleaving and scrambling operations on a bit output through the FEC 403. An interleaver/scrambler to be used in a block of the bit-level interleaver/scrambler 404 may be cell-specific or UE-specific, and accordingly, interference to another UE for transmitting a signal by using the same time and frequency resources may be randomized.

A device for performing the symbol-level operation 402 may include a modulated symbol sequence generator 405 and a symbol-to-RE mapping 406. Blocks of the modulated symbol sequence generator 405 and the symbol-to-RE mapping 406 may include single or multi-tone modulation, UE-specific symbol spreading (through repetition), cell or/and UE-specific symbol-level interleaver/scrambler, sparse or non-sparse resource mapping, and transmission power control functions.

The structure of the transmitting terminal for NOMA is not limited to the structure shown in FIG. 4, and such an operation may be performed by another structure.

At least one UE operating in NOMA may modulate uplink data to be transmitted according to the above-described transmission structure of FIG. 4, and transmit the modulated uplink data to a base station through a PUSCH. In this case, one or a plurality of UEs performing NOMA may simultaneously transmit their PUSCHs in the same time and frequency resources. Accordingly, PUSCHs transmitted by one or the plurality of UEs may interfere with each other. However, each of the UEs may directly receive a multiple access (MA) signature ID from the base station, or indirectly estimate the MA signature ID through a UE-specific identifier (a UE ID, a DMRS scrambling ID, an ID additionally configured by the base station, etc.). Accordingly, the base station having received the PUSCH from one or the plurality of UEs performing NOMA may recover uplink data of each of the UEs by using a receiver in consideration of the above-described transmission structure, based on the MA signature ID (in grant-free-based transmission, the base station may estimate a specific UE having performed transmission through an MA signature ID.) used by each of the UEs.

Next, a structure of a receiving terminal for uplink non-orthogonal multiple access (NOMA) under consideration in 5G will be described in detail. The non-orthogonal multiple access refers to a technology which provides a communication service to a plurality of UEs in the same time and frequency resources. For example, the plurality of UEs may transmit an uplink data channel in the same time and frequency resources.

Figure 5:
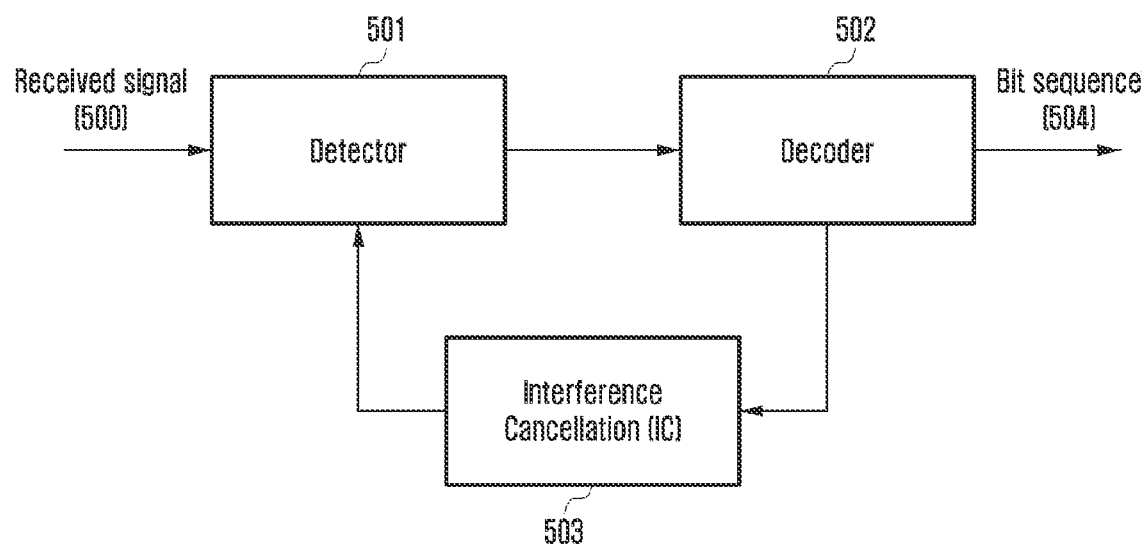
FIG. 5 is a diagram for explaining a structure of a receiving terminal for NOMA discussed in 5G according to the disclosure.

FIG. 5 is a diagram for explaining a structure of a receiving terminal for NOMA discussed in 5G according to the disclosure.

Referring to FIG. 5, a receiving terminal for NOMA may include blocks of a detector 501, a decoder 502, and an interference canceller 503.

A signal 500 received by a receiver may pass through the detector 501 to compensate for signal distortion caused by a channel. The output signal having passed through the detector 501 may be input to the decoder 502 to undergo a decoding process for channel coding. The output signal having passed through the decoder 502 may be subjected to an additional interference cancellation operation through the interference canceller 503. The interference cancellation operation may include various signal processing techniques for the purpose of removing signal interference between users in NOMA. A value of the output signal having passed through the interference canceller 503 may be input to the decoder 501 again, and the above-described procedure may be repeatedly performed. After the above-described procedure is repeatedly performed, a NOMA receiver may output a bit sequence 504 as a final output value.

Next, a non-approval-based transmission scheme of 5G will be described.

Figure 6:
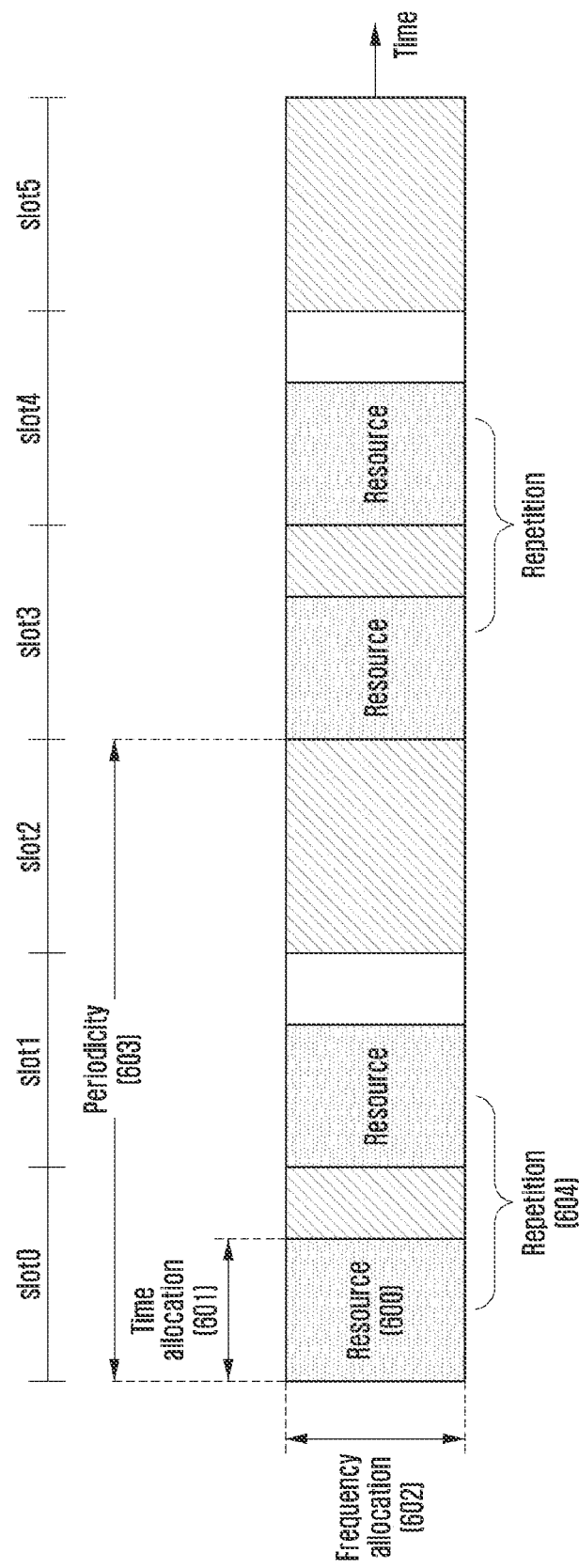
FIG. 6 is a diagram for explaining an example of a non-approval-based transmission scheme of 5G according to the disclosure.

FIG. 6 is a diagram for explaining an example of a non-approval-based transmission scheme of 5G according to the disclosure.

In 5G, for non-approval (referred to as configured grant, grant-free, etc.)-based transmission methods for an uplink data channel (PUSCH), two types (grant-free-based PUSCH transmission type-1 (type-1 PUSCH transmission with a configured grant), and grant-free-based PUSCH transmission type-2 (type-1 PUSCH transmission with a configured grant)) are supported.

[Grant-Free-Based PUSCH Transmission Type-1]

In the grant-free-based PUSCH transmission type-1, a base station may configure a specific time/frequency resource 600 for allowing grant-free-based PUSCH transmission in a UE through higher layer signaling, for example, RRC signaling. For example, as shown in FIG. 6, time-axis allocation information 601, frequency-axis allocation information 602, period information 603, and the like relating to the resource 600 may be configured through RRC signaling. In addition, the base station may configure, in the UE, various parameters for PUSCH transmission (for example, frequency hopping, DMRS configuration, a modulation and coding scheme (MCS) table, an MCS, a resource block group (RBG) size, the number of repeated transmissions, redundancy version (RV), etc.) through higher layer signaling. More specifically, the base station may configure, in the UE, configuration information in Table 5 below through higher layer signaling.

TABLE 5

```
ConfiguredGrantConfig ::= SEQUENCE {
    frequencyHopping ENUMERATED {mode1, mode2}
        OPTIONAL, -- Need S,
    cg-DMRS-Configuration DMRS-UplinkConfig,
    mcs-Table ENUMERATED {qam256, spare1}
        OPTIONAL, -- Need S
    mcs-TableTransformPrecoder ENUMERATED {qam256, spare1}
        OPTIONAL, -- Need S
    uci-OnPUSCH SetupRelease { CG-UCI-OnPUSCH },
    resourceAllocation ENUMERATED { resoureeAllocationType0,
resourceAllocationType1, dynamicSwitch },
    rbg-Size ENUMERATED {config2} OPTIONAL,-- Need
S
    powerControlLoopToUse ENUMERATED {n0, n1},
    p0-PUSCH-Alpha P0-PUSCH-AlphaSetId,
    transformPrecoder ENUMERATED {enabled} OPTIONAL, --
Need S
    nrofHARQ-Processes INTEGER(1..16),
    repK ENUMERATED {n1, n2, n4, n8},
    repK-RV ENUMERATED {s1-0231, s2-0303, s3-0000}
        OPTIONAL, -- Cond RepK
    periodicity ENUMERATED {
        sym2, sym7, sym1x14, sym2x14, sym4x14,
sym5x14, sym8x14, sym10x14, sym16x14, sym20x14,
        sym32x14, sym40x14, sym64x14, sym80x14,
sym128x14, sym160x14, sym256x14, sym320x14, sym512x14,
        sym640x14, sym1024x14, sym1280x14,
sym2560x14, sym5120x14,
        sym6, sym1x12, sym2x12, sym4x12, sym5x12,
sym8x12, sym10x12, sym16x12, sym20x12, syrn32x12,
        sym40x12, sym64x12, sym80x12, sym128x12,
sym160x12, sym256x12, sym320x12, sym512x12, sym640x12,
        sym1280x12, sym2560x12
    },
    configuredGrantTimer INTEGER (1..64) OPTIONAL, -- Need R
    rrc-ConfiguredUplinkGrant SEQUENCE {
        timeDomainOffset INTEGER (0..5119),
        timeDomainAllocation INTEGER (0..15),
        frequencyDomainAllocation BIT STRING (SIZE(18)),
        antennaPort INTEGER (0..31),
    dmrs-SeqInitialization INTEGER (0..1) OPTIONAL, -- Cond
NoTransforinPrecoder
        precodingAndNumberOftayers INTEGER (0..63),
        srs-ResourceIndicator INTEGER (0..15),
        mcsAndTBS INTEGER (0..31),
        frequencyHoppingOffset INTEGER (1..
maxNrofPhysicalResourceBlocks-1) OPTIONAL, -- Need M
        pathlossReferenceIndex INTEGER (0..maxNrofPUSCH-
PathlossReferenceRSs-1),
        ...
    }
} OPTIONAL -- Need R
```

When configuration information for grant-free-based PUSCH transmission type-1 is received from the base station, the UE may transmit a PUSCH without a grant of the base station through the periodically configured resource 600. Various parameters required for PUSCH transmission (for example, frequency hopping, DMRS configuration, an MCS, a resource block group (RBG) size, the number of repeated transmissions, redundancy version (RV), precoding and the number of layers, an antenna port, a frequency hopping offset, etc.) may all follow a configuration value notified by the base station.

[Grant-Free-Based PUSCH Transmission Type-2]

In the grant-free-based PUSCH transmission type-2, the base station may configure, in the UE, a part (for example, the period information 603) of information on the specific time/frequency resource 600 for allowing grant-free-based PUSCH transmission, through higher layer signaling (for example, RRC signaling). In addition, the base station may configure, in the UE, various parameters for PUSCH transmission (for example, frequency hopping, DMRS configuration, an MCS table, a resource block group (RBG) size, the number of repeated transmissions, redundancy version (RV), etc.) through higher layer signaling. More specifically, the base station may configure, in the UE, configuration information in Table 6 below through higher layer signaling.

TABLE 6

```
ConfiguredGrantConfig ::= SEQUENCE {
    frequencyHopping ENUMERATED {mode1, mode2}
        OPTIONAL, -- Need S,
    cg-DMRS-Configuration DMRS-UplinkConig,
    mcs-Table ENUMERATED {qam256, spare1}
        OPTIONAL, -- Need S
    mcs-TableTransformPrecoder ENUMERATED {qam256, spare1}
        OPTIONAL,
    -- Need S
    uci-OnPUSCH SetupRelease { CG-UCI-OnPUSCH },
    resourceAllocation ENUMERATED { resourceAllocationType0,
resourceAllocationType1, dynamicSwitch },
    rbg-Size ENUMERATED {config2} OPTIONAL,
    -- Need S
    powerControlLoopToUse ENUMERATED {n0, n1},
    p0-PUSCH-Alpha P0-PUSCH-AlphaSetId,
    transformPrecoder ENUMERATED {enabled} OPTIONAL,
    -- Need S
    nrofHARQ-Processes INTEGER(1..16),
    repK ENUMERATED {n1, n2, n4, n8},
    repK-RV ENUMERATED {s1-0231, s2-0303, s3-0000}
        OPTIONAL, -- Cond. RepK
    periodicity ENUMERATED {
        sym2, sym7, sym1x14, sym2x14, sym4x14,
sym5x14, sym8x14, sym10x14, sym16x14, sym20x14,
        sym32x14, sym40x14, sym64x14, sym80x14,
sym128x14, sym160x14, sym256x14, sym320x14, sym512x14,
        sym640x14, sym1024x14, sym1280x14,
sym2560x14, sym5120x4,
        sym6, sym1x12, sym2x12, sym4x12, sym5x12,
sym8x12, sym10x12, sym16x12, sym20x12, sym32x12,
        sym40x12, sym64x12, sym80x12, sym128x12,
sym160x12, sym256x12, sym320x12, sym512x12, sym640x12,
        sym1280x12, sym2560x12
    },
    configuredGrantTimer INTEGER (1..64) OPTIONAL, -- Need R
}
```

The base station may configure a configured scheduling-RNTI (CS-RNTI) in the UE, and the UE may monitor a DCI format scrambled with the CS-RNTI. The DCI scrambled with the CS-RNTI may be used for the purpose of activating the grant-free-based PUSCH transmission type-2 (that is, the purpose of allowing grant-free-based PUSCH transmission to the UE). For example, when a DCI field of the DCI format scrambled with the CS-RNTI received by the UE satisfies a value described in Table 7 below, it may be determined as a trigger for grant-free-based PUSCH transmission.

TABLE 7

| | DCI format 0_0/0_1 |
| --- | --- |
| HARQ process number | set to all '0's |
| Redundancy version | set to '00' |

The base station may indicate the trigger of grant-free-based PUSCH transmission to the UE by using values of the specific fields, and notify the UE of specific time allocation information 601 and frequency allocation information 602 relating to the resource region 600 in which grant-free-based PUSCH transmission can be performed through a resource allocation field of the corresponding DCI. The UE may determine the resource region 600 for grant-free-based PUSCH transmission on the basis of the period information 603 configured through a higher layer and the time resource allocation information 601 and the frequency resource allocation information 602 obtained from the DCI scrambled with the CS-RNTI corresponding to the trigger, and perform grant-free-based PUSCH transmission in the corresponding resource region 600. That is, after the time point when the DCI corresponding to the trigger is received, the UE may transmit the PUSCH through the periodically configured resource 600 without a grant of the base station. A part of various parameters required for the UE to transmit the PUSCH (for example, parameters in Table 6 such as DMRS configuration information, an MCS table, an RBG size, the number of repeated transmissions, RV, and a power control parameter) may all follow a value configured by the base station through higher layer signaling, and the other parameters (for example, parameters corresponding to a field of DCI format 0_0/0_1, such as an MCS, precoding and the number of layers, an antenna port, and a frequency hopping offset) may follow a configuration value notified from the received DCI scrambled with the CS-RNTI for the trigger.

The base station may transmit, to the UE, the DCI scrambled with the CS-RNTI in order to release grant-free-based PUSCH transmission (that is, in order to stop allowing grant-free-based PUSCH transmission to the UE). In this case, when the field of the DCI format scrambled with the CS-RNTI received by the UE satisfies a value in Table 8 below, the UE may determine the field as a release for grant-free-based PUSCH transmission.

TABLE 8

| | DCI format 0_0 |
|---|---|
| HARQ process number | set to all '0's |
| Redundancy version | set to '00' |
| Modulation and coding scheme | set to all '1's |
| Resource block assignment | set to all '1's |

Next, a method for selecting an MA signature by UEs operating in NOMA of a grant-free-based transmission scheme will be described.

The method for selecting an MA signature by UEs operating in NOMA for grant-free-based PUSCH transmission may include a "random activation" method and a "random selection" method. The names of the two methods are named to aid understanding of the disclosure, and may be expressed differently.

In the "random activation" method, a base station allocates a UE-specific MA signature to each of the UEs using the same grant-free-based PUSCH transmission resource through an RRC signal or DCI according to the grant-free-based PUSCH transmission types by using a direct index or in an indirect manner (which may be expressed as a combination of a UE-specific ID, a slot index, and a grant-free-based transmission resource.). Pool Spool={S1, S2, . . . , SK} for an MA signature available between the base station and the UE may be defined, and the base station may indicate an MA signature index to the UE through the RRC signal or DCI. In the case of the method, if the base station has more MA signatures compared to the number of UEs intended to be supported in the same resource, a collision which occurs when multiple UEs perform transmission by using the same MA signature (If multiple UEs perform transmission by using the same signature in NOMA, the base station cannot distinguish the UEs having performed transmission and cannot perform reception.) may not occur.

According to the "random selection" method, a common MA signature pool (multiple different MA signatures are included) may be allocated to common UEs using the same grant-free-based PUSCH transmission resource of the base station. In addition, the UEs may randomly select an MA signature in the MA signature pool and perform transmission by using the selected MA signature. In the case of such a method, the base station may support more UEs than the limited number of MA signatures in the same resource. Particularly, it is advantageous when a transmission period of each of the UEs is independent and long. However, as described above, the first method can prevent UEs to use the same MA signature, but the second method cannot prevent a collision between UEs.

In various embodiments of the disclosure, the two methods for selecting an MA signature may be regarded as the "random activation" method in the case where the base station configures an MA signature in UEs through higher layer signaling (RRC signaling) or L1 signaling (DCI signaling) or configures a UE-specific MA signature in each of the UEs, and may be regarded as the "random selection" method in the case where only an MA signature pool is configured for each of the UEs.

First Embodiment

Figure 7:
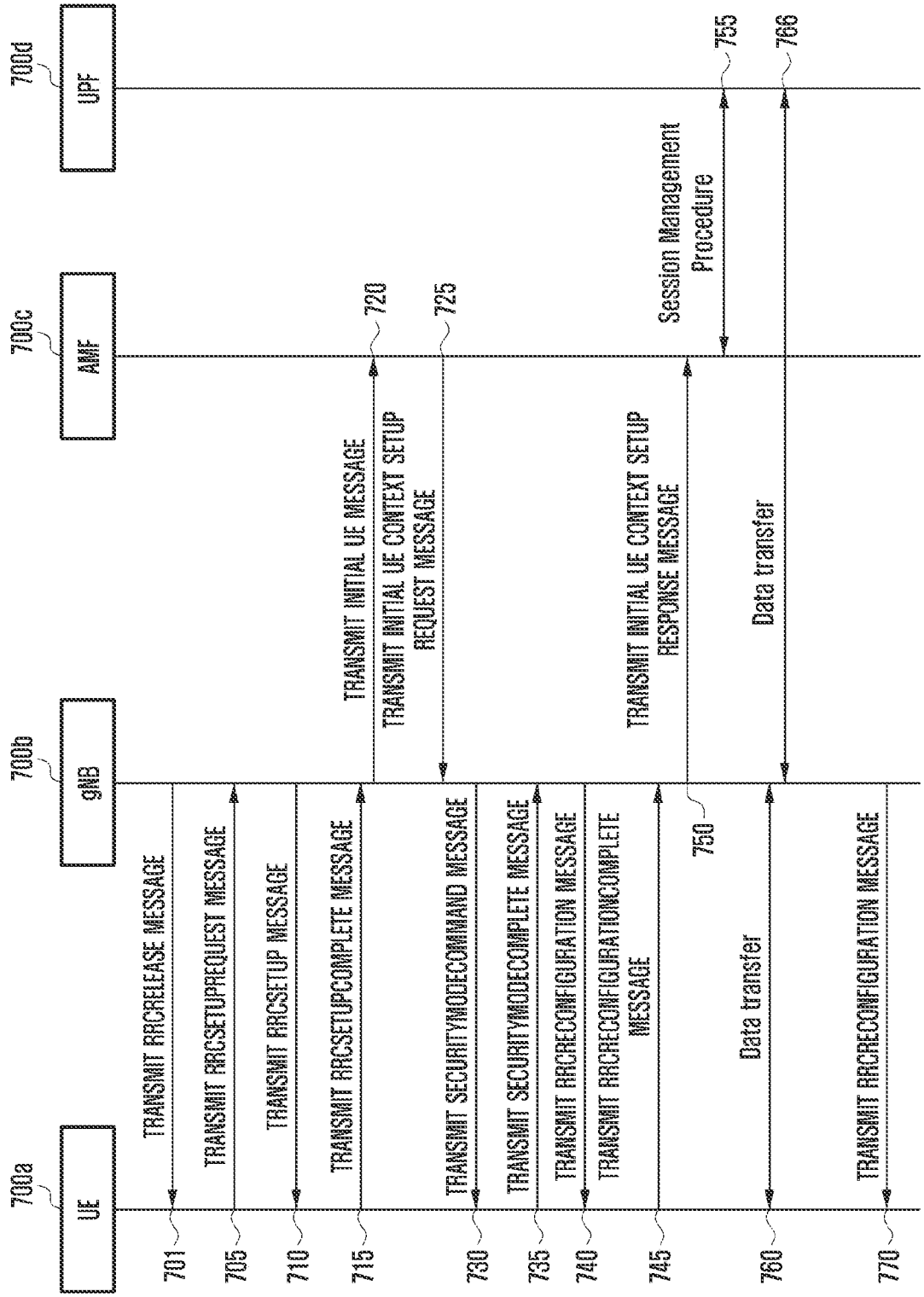
FIG. 7 illustrates a procedure in which a base station releases a connection of a terminal and thus the terminal switches from an RRC connected mode to an RRC idle mode, and a procedure in which a terminal establishes a connection with a base station and thus switches from an RRC idle mode to an RRC connected mode, in 5G according to the disclosure.

FIG. 7 illustrates a procedure in which a base station releases a connection of a UE and thus the UE switches from an RRC connected mode to an RRC idle mode, and a procedure in which a UE establishes a connection with a base station and thus switches from an RRC idle mode to an RRC connected mode, according to an embodiment of the disclosure.

Referring to FIG. 7, a wireless communication system may include a UE 700a, a base station 700b, an access and mobility management function (AMF) 700c, and a user plane function (UPF) 700d. The AMF 700c may be referred to as an entity which performs an access and mobility function, and the UPF 700d may be referred to as an entity which performs a user plane function.

When the UE 700a for transmitting or receiving data in an RRC connected mode does not transmit or receive data for a predetermined reason or for a predetermined time, the base station 700b may transmit a message for RRC connection release (for example, an RRC release message) to the UE 700a to allow the UE to switch to an RRC idle mode (operation 701). Afterwards, a UE for which the current connection is not established (hereinafter, an idle mode UE) may perform an RRC connection establishment process with the base station 700b when data to be transmitted occurs. The UE 700a may establish reverse transmission synchronization with the base station through a random access process, and transmit a message for an RRC connection request (for example, an RRC setup request message) to the base station 700b (operation 705). The message for the RRC connection request may include a reason for configuring a connection with an identifier of the UE 700a (for example, establishment cause), and the like.

The base station 700b transmits a message for RRC connection configuration (for example, an RRC setup message) so that the UE 700a configures an RRC connection (operation 710). The message for the RRC connection configuration may store RRC connection configuration information and the like. An RRC connection is also referred to as signaling radio bearer (SRB), and is used for transmission and reception of an RRC message which is a control message between the UE 700*a* and the base station 700*b*. The UE 700*a* having configured the RRC connection transmits a message for RRC connection configuration completion (for example, an RRC setup complete message) to the base station 700*b* (operation 715). The message for the RRC connection configuration completion may include a message for a service request (for example, a service request message) by which the UE 700*a* requests a bearer configuration for a predetermined service from the AMF 700*c*.

The base station 700*b* transmits, to the AMF 700*c*, an initial UE message in which the service request message stored in an RRC connection configuration completion message is stored (operation 720). The AMF 700*c* determines whether to provide a service requested by the UE 700*a*, based on the information received in operation 720. As a result of the determination, if it is determined that the AMF is to provide the service requested by the UE 700*a*, the AMF 700*c* transmits a message for initial UE context configuration request (for example, an initial UE context setup request message) to the base station 700*b* (operation 725). The message for the initial UE context configuration request includes quality of service (QoS) information to be applied when configuring a data radio bearer (DRB), security-related information (for example, a security key and a security algorithm) to be applied to the DRB, and the like.

The base station 700*b* transmits a message for a security mode command (for example, a security mode command message) to the UE 700*a* in order to configure security with the UE 700*a* (operation 730). The UE 700*a* having received the security mode command message transmits a message for security mode completion (for example, a security mode complete message) to the base station 700*b* (operation 735). When the security configuration is completed, the base station 700*b* transmits a message for RRC connection reconfiguration (for example, an RRC reconfiguration message) to the UE 700*a* (operation 740). The message for the RRC connection reconfiguration includes configuration information of the DRB to be used to process user data, and the UE 700*a* configures the DRB by applying the information, and transmits a message for RRC connection reconfiguration completion (for example, an RRCReconfigurationComplete message) to the base station 700*b* (operation 745).

The base station 700*b* having completed DRB configuration with the UE 700*a* transmits a message for an initial UE context configuration request response (for example, an initial UE context setup response message) to the AMF 700*c* (operation 750). The AMF 700*c* having received the message performs a session management procedure with the UPF 700*d* to establish a PDU session (operation 755).

When all of the above processes are completed, the UE 700*a* may transmit or receive data through the base station 700*b* and the UPF 700*d* (operations 760 and 765). This general data transmission process includes three steps of an RRC connection configuration, a security configuration, and a DRB configuration. In addition, the base station 700*b* may transmit an RRC reconfiguration message to the UE 700*a* for a predetermined reason to newly establish, add, or change a configuration (operation 770).

As described above, a large number of signaling procedures are required in order for the UE 700*a* to configure an RRC connection and switch from an RRC idle mode to an RRC connected mode. Therefore, an RRC inactive mode is defined in the next-generation mobile communication system. In the above mode, since the UE 700*a* and the base station 700*b* may store the context of the UE, and maintain an S1 bearer if necessary, when the UE in the RRC inactive mode attempts to reconnect to the network, an RRC reconnection configuration procedure described below may enable faster access and transmission or reception of data with a smaller number of signaling procedures.

Figure 8:
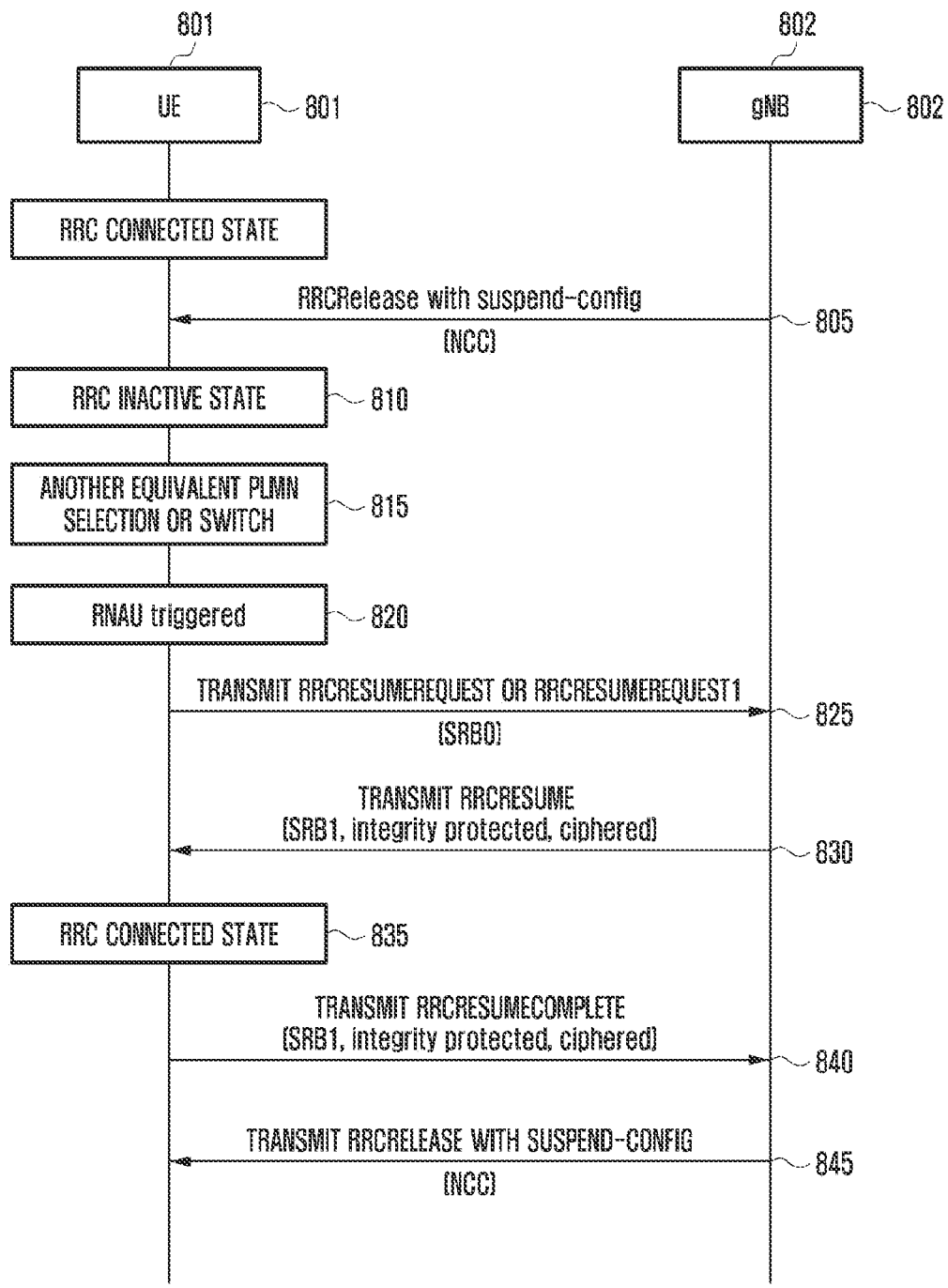
FIG. 8 illustrates a procedure in which a base station releases a connection of a terminal and thus the terminal switches from an RRC connected mode to an RRC inactive mode, and a procedure in which a terminal establishes a connection with a base station and thus switches from an RRC inactive mode to an RRC connected mode, in 5G according to the disclosure.

FIG. 8 illustrates a procedure in which a base station releases a connection of a UE and thus the UE switches from an RRC connected mode to an RRC inactive mode, and a procedure in which a UE establishes a connection with a base station and thus switches from an RRC inactive mode to an RRC connected mode, according to an embodiment of the disclosure.

In FIG. 8, a UE 801 may perform a network connection with a base station 802 and transmit or receive data. If the base station 802 is required to transition the UE 801 to an RRC inactive mode for a predetermined reason, the base station 802 may transmit an RRC connection release message (an RRC release message) including suspend configuration information (suspend Config) to the UE 801 (operation 805), and transition the UE 801 to the RRC inactive mode (operation 810). The suspend configuration information may include configuration information for RRC inactive, and may include an inactive-radio network temporary identifier (I-RNTI). The I-RNTI may be a resume identity. The UE 801 having transitioned to the RRC inactive mode may reselect or switch/transit another equivalent PLMN from the current equivalent PLMN or registered PLMN while moving (operation 815). In addition, the UE 801 may trigger an RAN-based notification area update (RNAU) when an update condition is satisfied (operation 820).

When a higher layer of the UE 801 requests RRC connection resume or an RRC layer requests RRC connection resume, the UE 801 in the RRC inactive mode performs a random access procedure and transmits an RRC resume request message or an RRC resume request1 message to the base station 802 (operation 825). For example, the UE may determine that an RRC connection resume request is required according to a trigger of the RNAU. The RRC resume request message or the RRC resume request1 message may be transmitted through SRB0. The UE 801 receives an RRC connection resume message (an RRC resume message) from the base station 802 in response to the RRC connection resume request (operation 830). The RRC resume message may be received through SRB1, and integrity protection and ciphering may be performed on the message. After receiving the RRC connection resume message, the UE 801 transitions to an RRC connected mode (operation 835). For transmission to lower layer devices, the UE transmits an RRC connection resume completion message (an RRC resume complete message) to the base station 802 (operation 840). The RRC resume complete message may be transmitted through SRB1, and integrity protection and ciphering may be performed on the message. In addition, the base station 802 may directly transmit an RRC release message including suspend configuration information to the UE 801 (operation 845). Alternatively, when the base station 802 does not transmit the RRC release message including the suspend configuration information to the UE 801 in operation 845, the UE 801 may transmit or receive data to or from the base station 802. Alternatively, in operation 845, the base station 802 may transmit another RRC message (for example, an RRC reject message, and an RRC release message which does not include suspend configuration information) to the UE.

Although the same reference numeral 802 is used for a base station in the embodiment of FIG. 8, a base station before an RRC inactive state and a base station for which a UE newly requests resume according to an RRC resume procedure may be different from each other.

As described above, when RRC connection resume is requested in the RRC inactive mode, the random access procedure is performed. In this case, the following procedure is performed. Upon completion of the random access procedure, the UE switches to a connected state, and one-to-one communication between the base station and the UE is possible. The UE may perform a 4-step random access procedure or a 2-step random access procedure described below.

Figure 9:
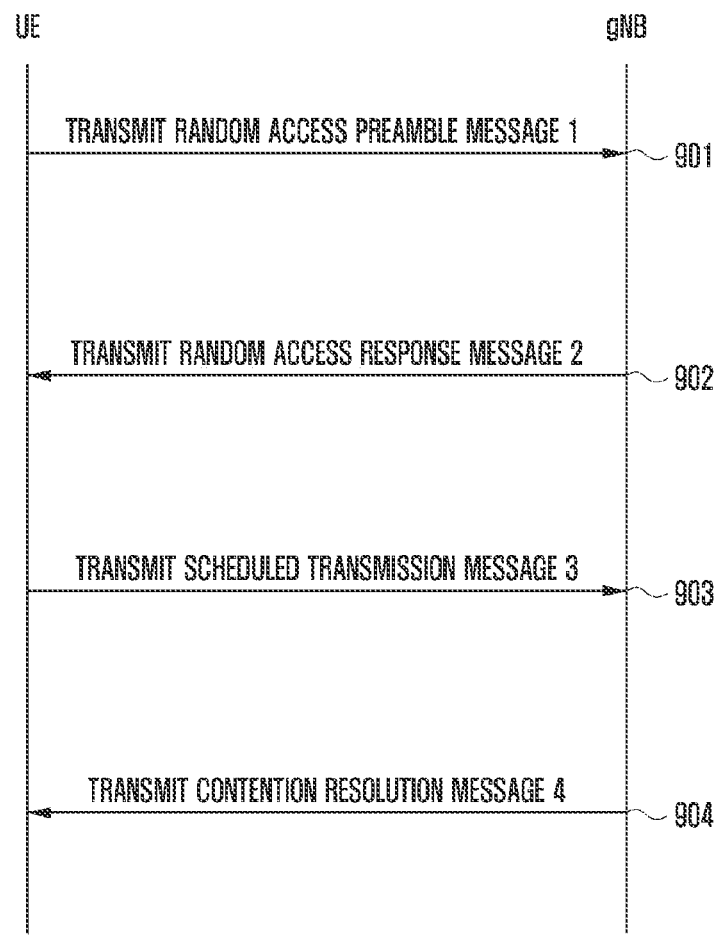
FIG. 9 illustrates a 4-step random access channel procedure in 5G according to the disclosure.

Hereinafter, the 4-step random access procedure (4-step RACH procedure) will be described in detail with reference to FIG. 9. Referring to FIG. 9, as a first stage 901 of the random access procedure, a UE transmits a random access preamble to a base station. The base station having received the random access preamble from the UE measures a transmission delay value between the UE and the base station, and adjusts uplink synchronization. In this case, the UE randomly selects a random access preamble to use within a random access preamble set previously given by a system information. In addition, an initial transmission power of the random access preamble is determined according to pathloss between the base station and the UE, the pathloss being measured by the UE. In addition, the UE transmits the random access preamble by determining a transmission beam direction of the random access preamble from a synchronization signal received from the base station.

In a second stage 902, the base station transmits an uplink transmission timing control command to the UE based on a transmission delay value measured from the random access preamble received in the first stage. In addition, the base station transmits a power control command and an uplink resource to be used by the UE as scheduling information. The scheduling information may include control information relating to an uplink transmission beam of the UE. The information may be included in a random access response (RAR) message and transmitted to the UE.

If the UE does not receive a random access response (RAR, message 2), which is scheduling information relating to message 3, from the base station for a predetermined time in the second stage 902, the first stage 901 is re-performed. If the first stage is re-performed, the UE increases a transmission power of the random access preamble by a predetermined step and transmits the transmission power (power ramping), thereby increasing the probability of receiving the random access preamble of the base station.

In a third stage 903, the UE transmits uplink data (message 3) including the UE's own ID to the base station through an uplink data channel (PUSCH) by using the uplink resource allocated in the second stage 902. A transmission timing of the uplink data channel for transmitting the message 3 follows the timing control command received from the base station in the second stage 902. In addition, a transmission power of the uplink data channel for transmitting the message 3 is determined in consideration of the power control command received from the base station in the second stage 902 and a power ramping value of the random access preamble. The uplink data channel for transmitting the message 3 is the first uplink data signal transmitted by the UE to the base station after the UE transmits the random access preamble.

Lastly, if it is determined that the UE has performed random access without a collision with another UE (contention resolution) in a fourth stage 904, the base station transmits, to the corresponding UE, data (message 4) including the ID of the UE having transmitted the uplink data in the third stage 903. If the UE receives, from the base station, a signal transmitted by the base station in the fourth stage 904, the UE determines that the random access has succeeded. In addition, the UE transmits HARQ-ACK/NACK indicating whether the message 4 is successfully received to the base station through an uplink control channel (PUCCH).

If data transmitted by the UE in third stage 903 collides with data of another UE and thus the base station fails to receive a data signal from the UE, the base station does not transmit any more data to the UE. Accordingly, if the UE fails to receive data transmitted in the fourth stage 904 from the base station for a predetermined time interval, the UE determines that the random access procedure has failed, and re-starts from the first stage 901.

As described above, the 4-step random access procedure requires a large number of signaling procedures. Therefore, in the next-generation mobile communication system, the 2-step random access procedure (2-step RACH procedure) in which the UE switches to a connected state through a smaller number of signaling procedures and one-to-one communication between the base station and the UE is possible may be newly defined.

In a new procedure as described above as shown in FIG. 10, a UE transmits, to a base station, both a random access preamble in the first stage of the existing procedure, and uplink data (message 3) including its own UE ID in the third stage (operation 1001). The base station may receive the signal and then transmit, to the UE, both a signal in a second stage including an uplink transmission timing control command and a signal in a fourth stage for determining success of random access (operation 1002), and thus perform faster access and transmit or receive data through a smaller number of signaling procedures.

In this case, multiple UEs may access at the same time due to the nature of random access if the 2-step random access procedure is transmitted through NOMA, and the multiple UEs can simultaneously transmit data corresponding to the message 3 by using different MA signatures in the same physical resource, and thus transmit the data more efficiently without the need to allocate a resource for multiple UEs.

However, since both the first stage and the third stage of the 4-step random access procedure are transmitted in the random access procedure and thus various parameters (an uplink resource and a power control command, an MCS, frequency hopping, etc.) required to transmit the message 3 (PUSCH) cannot be received, parameter information is required to be received or a default value is required to be set in a method different from the 4-step random access. Particularly, since a collision may occur according to the use of the same MA signature by UEs when both the preamble and the message 3 are transmitted through the NOMA, the UEs are required to perform the random access procedure by using different MA signatures, respectively.

However, the UE in an RRC inactive mode stores or configures MA signature information used in a connected mode. However, since the number of MA signatures that can be distinguished by the base station is limited, the base station may allocate the MA signature used by the UE switched to the RRC inactive mode to the UE in the connected mode in order to efficiently support a larger number of UEs in the connected mode. In this case, when the UE in the RRC inactive mode performs the 2-step random access procedure using NOMA to resume an RRC connection, the UE may perform transmission by using the existing MA signature used in the connected mode in order to transmit both the preamble and the data (message 3). In this case, a collision may occur with the UE using the same MA signature in the connected mode. In addition, a collision may occur when the UEs having used the same MA signature in different time zones in the connected mode and switched to the RRC inactive mode want to switch to the connected mode again.

Figure 11A:
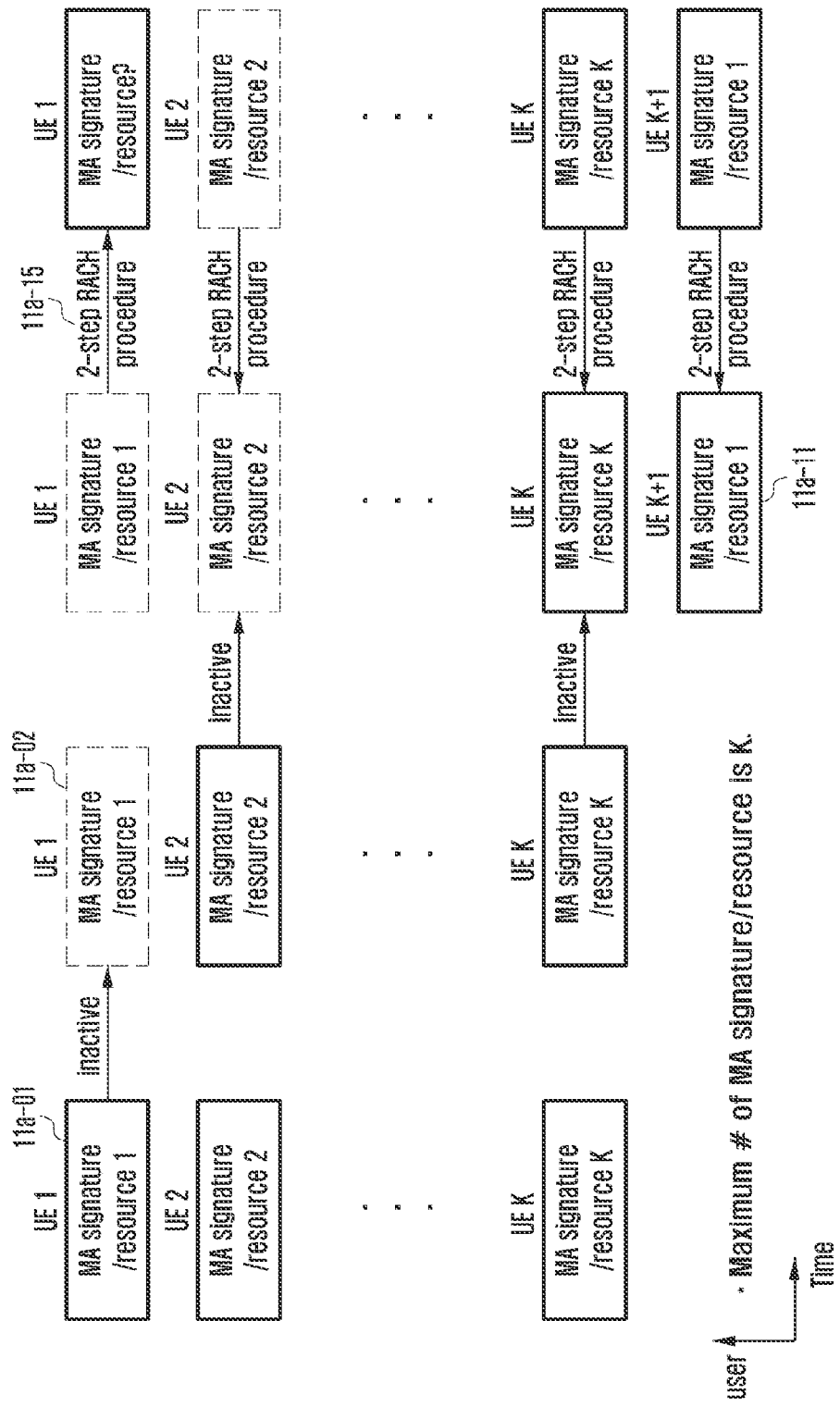
FIG. 11A is a diagram for explaining occurrence of a collision in the case of performing a 2-step random access procedure through NOMA in an RRC inactive mode according to an embodiment of the disclosure.
Figure 11B:
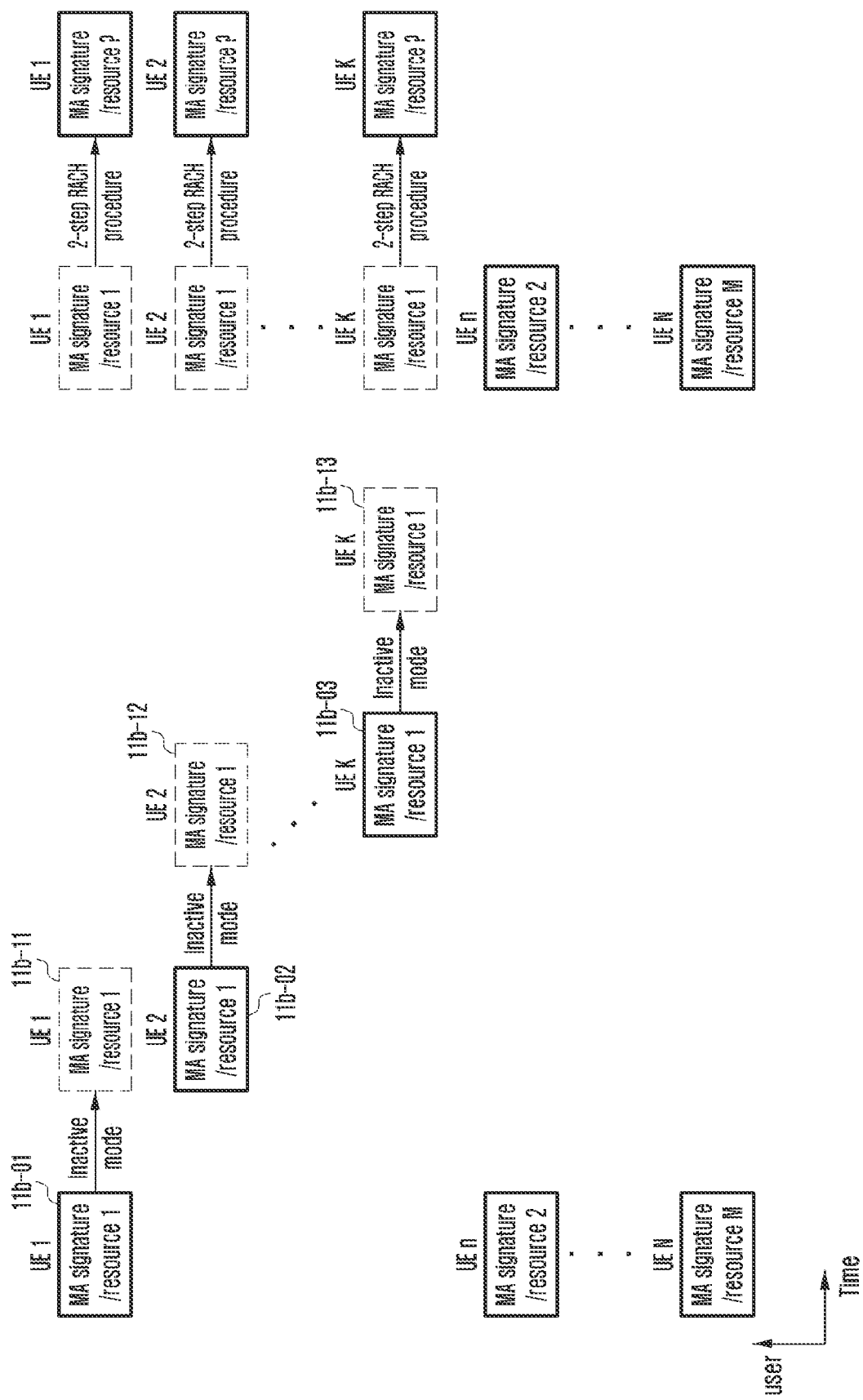
FIG. 11B is a diagram for explaining occurrence of another collision in the case of performing a 2-step random access procedure through NOMA in an RRC inactive mode according to an embodiment of the disclosure.

FIGS. 11A and 11B are examples showing the above description. In FIG. 11A, when UE 1 has used MA signature 1 (11a-01) and then switched to an RRC inactive mode (11a-02), the base station may allocate to use the MA signature 1 used by the UE 1 switched to the RRC inactive mode in order to support new UE K+1 (11a-11). In this case, when the UE 1 performs the 2-step random access procedure using NOMA to resume an RRC connection in the RRC inactive mode again (11a-15), the UE may perform transmission by using the existing MA signature 1 used in the connected mode in order to transmit both the preamble (message 1) and the data (message 3). In this case, uplink transmission of the UE 1 in the connected mode may collide with uplink transmission of the UE K+1 using the same MA signature.

As another example, as shown in FIG. 11B, when all the UE 1 to UE k have used the MA signature 1 in different time zones in the connected mode (11b-01, 11b-02, and 11b-03) and switched to the RRC inactive mode (11b-11, 11b-12, and 11b-13), a collision may occur when time zones, in which the UEs having switched to the RRC inactive mode want to switch to the connected mode again, overlap, and when the UEs use the existing MA signature 1 used in the connected mode.

Accordingly, an embodiment of the disclosure provides a method for selecting an MA signature to reduce a collision between UEs when a UE performs the 2-step random access procedure using NOMA to resume an RRC connection in an RRC inactive mode.

The following methods may be considered as a method for selecting an MA signature.

[Method 1]

As described above, if it is necessary for a base station to transition a UE to an RRC inactive mode, the base station may transmit a higher layer signaling (for example, a message for RRC connection release, and an RRC release message) including suspend configuration information (suspend Config) (operation 805) to transition the UE to the RRC inactive mode. In this case, the base station may explicitly configure an MA signature to be used in the 2-step random access procedure for the UE to switch from the RRC inactive mode to an RRC connected mode through a message for RRC connection release (an RRC release message).

[Method 2]

As described above, if it is necessary for a base station to transition a UE to an RRC inactive mode, the base station may transmit a higher layer signaling (for example, a message for RRC connection release, and an RRC release message) including suspend configuration information (suspend Config) (operation 805) to transition the UE to the RRC inactive mode. In this case, the base station may notify the UE of MA signature index $i_{sig}$ by using the following equation, based on an I-RNTI value included in the message for RRC connection release (the RRC release message). In various embodiments of the disclosure, an I-RNTI may be defined as a resume identity.

$$i_{sig}=\mathrm{mod}(I\text{-}\mathrm{RNTI}, N_{sig}) \qquad \text{[Equation 1]}$$

As described above, in the above equation, I-RNTI is a value included in the RRC release message and is a value designated by the base station to the UE which switches to the RRC inactive mode. In addition, $N_{sig}$ denotes the total number of MA signatures possessed by the base station. Through the above equation, the base station may indicate an index to the UE without adding or changing the existing RRC signaling, and based on the index, the UE may transmit a preamble and data by using an MA signature indicated in the random access procedure when switching from the RRC inactive mode to the connected mode.

[Method 3]

As described above, if it is necessary for a base station to transition a UE to an RRC inactive mode, the base station may transmit a higher layer signaling (for example, a message for RRC connection release, and an RRC release message) including suspend configuration information (suspend Config) (operation 805) to transition the UE to the RRC inactive mode. In this case, the base station may notify the UE of index $i_{sigpool}$ of an MA signature pool by using the following equation, based on an I-RNTI value included in the message for RRC connection release (the RRC release message).

$$i_{sigpool}=\mathrm{mod}(I\text{-}\mathrm{RNTI}, N_{sigpool}) \qquad \text{[Equation 2]}$$

As described above, in the above equation, I-RNTI is a value included in the RRC release message and is a value designated by the base station to the UE which switches to the RRC inactive mode. In addition, $N_{sigpool}$ denotes the total number of MA signature pools possessed by the base station. Through the above equation, the base station may indicate an index to the UE without adding or changing the existing RRC signaling, and based on the index, the UE may transmit a preamble and data by randomly selecting an MA signature from an MA signature pool indicated in the random access procedure when switching from the RRC inactive mode to the connected mode.

[Method 4]

As described above, if it is necessary for a base station to transition a UE to an RRC inactive mode, the base station may transmit a higher layer signaling (for example, a message for RRC connection release, and an RRC release message) including suspend configuration information (suspend Config) (operation 805) to transition the UE to the RRC inactive mode. The UE may identify a resource for data transmission, based on information included in the RRC release message. For example, the base station may notify the UE of index $i_{occasion}$ of a data transmission resource by using the following equation, based on an I-RNTI value included in the message for RRC connection release (the RRC release message). At least one of a frequency resource or a time resource may be indicated in correspondence to $i_{occasion}$.

$$i_{occasion}=\mathrm{mod}(I\text{-}\mathrm{RNTI}, N_{occasion}) \qquad \text{[Equation 3]}$$

As described above, in the above equation, I-RNTI is a value included in the RRC release message and is a value designated by the base station to the UE which switches to the RRC inactive mode. In addition, $N_{occasion}$ denotes the total number of resources in which data can be transmitted in the random access procedure and which are allocated by the base station. Through the above equation, the base station may indicate an index to the UE without adding or changing the existing RRC signaling, and based on the index, the UE may transmit a preamble and data, based on an MA signature used in the connected mode before switching to the RRC inactive mode in a physical resource (a frequency and time resource) indicated in the random access procedure when switching from the RRC inactive mode to the connected mode.

Equation 3 is only an embodiment of method 4, and does not limit the scope of rights of method 4. For example, although a resource for data transmission is identified based on an I-RNTI and $N_{occasion}$, an equation may be different. In addition, a parameter different from the I-RNTI or $N_{occasion}$ may be used. For example, instead of $N_{occasion}$, the UE may use the number of SSBs per RACH occasion, the total number of preambles used for contention based and contention free random access, the number of actually transmitted synchronization signal blocks (SSBs) in a half frame, the maximum number of SSBs of a system frequency, or the maximum number of SSBs corresponding to a center frequency. Such information may be referred to as resource-related information. Various parameters as described above may be provided when switching to an RRC inactive state through the RRC release message, or the UE in the RRC inactive state may obtain the parameters through system information. In addition, a part of information may be obtained through the RRC release message, and a part of information may be obtained through the system information. Information received through RRC release information, such as an I-RNTI or UE-specific information, may be referred to as first information. In addition, information corresponding to the information $N_{occasion}$ may be referred to as second information. The second information may be obtained through the system information. The resource for data transmission may be referred to as a transmission resource or a PUSCH transmission resource, and different PUSCH transmission resources may be selected according to a preamble index selected by the UE.

In the method 1, method 2, method 3, and method 4, the base station allocates an MA signature to be used in the RRC inactive mode when each UE is switched to the RRC inactive mode, and thus can efficiently allocate the MA signature. In addition, since the MA signature may be dynamically changed, the MA signature may be efficiently used when the number of UEs to be supported increases rapidly or when an environment changes rapidly. For example, since it is unlikely that multiple UEs simultaneously switch from the RRC inactive mode to the connected mode, the base station may allocate an MA signature to be used in the RRC inactive mode less than the number of UEs in the RRC inactive mode and allocate more MA signatures to the UEs in the connected mode, and the base station may allocate the MA signature to each of the UEs according to the number of UEs or situations, and thus the base station can efficiently allocate the MA signature. For example, an MA signature to be used in the inactive mode may be determined based on the number of UEs in the connected mode and the number of UEs in the RRC inactive mode in relation to the base station.

Through the methods 1 to 4, an MA signature to be used by the UE in the RRC inactive state may be explicitly indicated using a parameter included in the RRC release message, and an index, an index pool, and an occasion may be identified based on an I-RNTI. Meanwhile, although the I-RNTI is described above as an example, the disclosure is not limited to the I-RNTI, and does not exclude the identification of an MA signature using another parameter included in the RRC release message.

[Method 5]

When a UE switches from an RRC inactive mode to a connected mode, the UE may explicitly receive an MA signature or an MA signature pool (a second MA signature or a second MA signature pool) used for data transmission in the 2-step random access procedure through RRC signaling or L1 signaling in the connected mode, independently from an MA signature or an MA signature pool (a first MA signature or a first MA signature pool) used in the connected mode. In the case of the above method, since it is not known which UEs are to be changed to the RRC inactive mode, the above method may semi-statically notify the UE, unlike the method 1, method 2, method 3, and method 4 for notifying the UE when dynamically switching to the RRC inactive mode, and in the above method, MA signatures may be used inefficiently compared to the methods for dynamically notifying the UE of an MA signature. In addition, the second MA signature or the second MA signature pool may be configured based on the first MA signature or the first MA signature pool. For example, offset information or the like for the first MA signature or the first MA signature pool may be configured to configure the second MA signature or the second MA signature pool, and the corresponding information is not limited to the offset information.

[Method 6]

When a UE switches from an RRC inactive mode to a connected mode, the UE may be explicitly configure an MA signature or an MA signature pool (a second signature or a second signature pool) used for data transmission in the 2-step random access procedure through system information. Since all UEs in an RRC idle mode and an RRC inactive mode receive the system information in common, and thus multiple UEs simultaneously select and transmit the same MA signature, the probability of collision occurrence may increase. In addition, since the MA signature cannot be dynamically changed, it is not easy to change when the number of UEs to be supported increases rapidly or when an environment changes rapidly. However, in an environment where the number of UEs does not change rapidly, UEs may commonly select an MA signature based on the system information. In addition, after the second signature or the second signature pool is configured through the system information, a new second signature or a new second signature pool may be configured using a dedicated RRC message. In this case, the new second signature or second signature pool configured through the dedicated RRC message may replace the second signature or the second signature pool configured through the system information.

The above-described method 1, method 2, method 3, method 4, method 5, and method 6 may be operated in combination with each other.

Through the first embodiment of the disclosure, each UE may receive an indication of an MA signature or a MA signature pool which can reduce a collision even when multiple UEs transmit data in the same resource through NOMA when performing the 2-step random access procedure in the RRC inactive mode. The base station may determine in advance an MA signature used by each UE in the RRC inactive mode, and accordingly, the complexity required for determining whether each UE transmits a PUSCH in the NOMA can be minimized.

Figure 10:
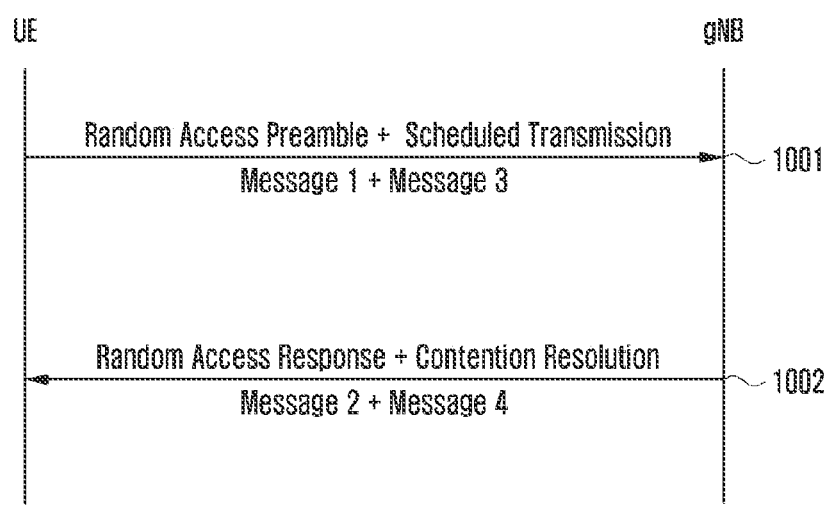
FIG. 10 illustrates a 2-step random access channel procedure in 5G according to the disclosure.

The UE and the base station may perform an RRC inactive operation according to the procedure shown in FIG. 8. The UE in the RRC inactive state may receive at least one of resource information for random access and resource information for PUSCH transmission through system information. When the UE in the RRC inactive state intends to switch to the RRC connected state, a random access procedure according to the procedure of FIG. 9 or 10 may be performed. In addition, when performing the 2-step random access procedure as shown in FIG. 10, the UE may identify identification information or a resource for transmitting data, based on the method described above. For example, the methods 1 to 6 may be used.

The UE may select a random access preamble and identify information for data transmission by using at least one of the above methods 1 to 6. The UE may transmit a random access preamble and data. The base station may receive the random access preamble and data from the UE and, accordingly, transmit a random access response to the UE.

Second Embodiment

A second embodiment describes a method in which when a base station provides an indication to a UE through a physical signal (for example, DCI) or a higher layer signal (for example, RRC signaling) such that multiple PUSCHs share a part of or the entire frequency band in symbols having the same time index and thus the UE transmits multiple uplink data, the UE can simultaneously transmit multiple data through NOMA. One example related to the environment is as follows.

Figure 12:
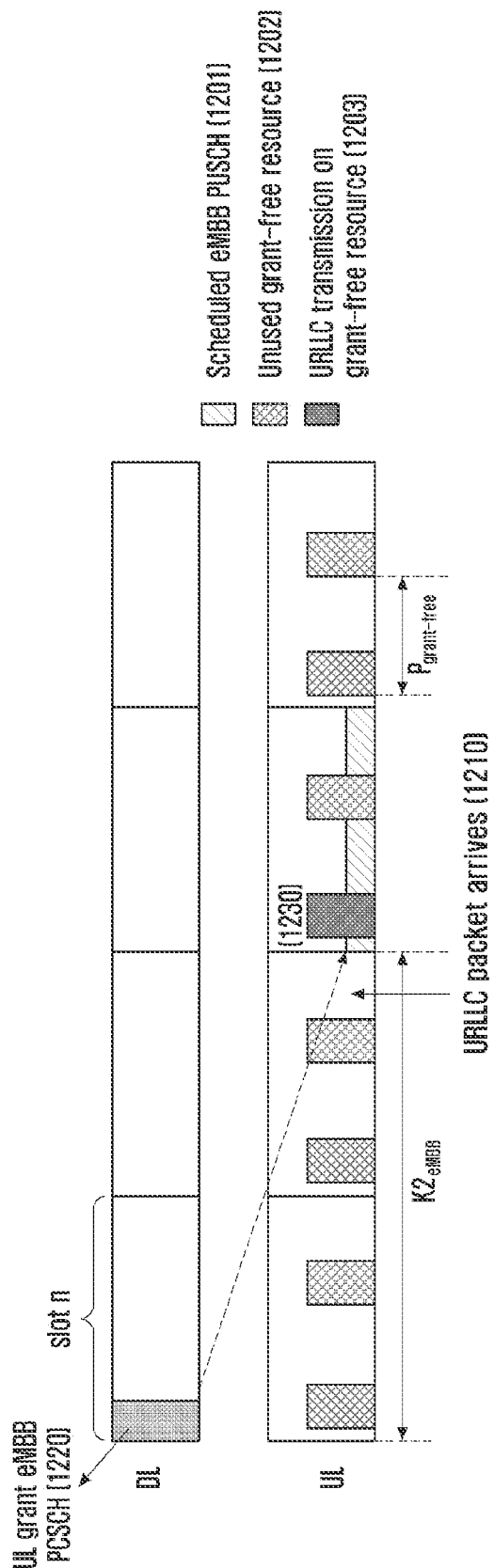
FIG. 12 illustrates a case in which one terminal simultaneously transmits eMBB service data and URLLC service data according to a second embodiment of the disclosure.

As shown in FIG. 12, the base station may configure a semi-static time/frequency resource 1202 for transmission of URLLC service data in the UE through higher layer signaling (RRC signaling). When URLLC traffic 1210 to be transmitted to the base station occurs, the UE transmits the URLLC traffic 1210 in a grant-free-based transmission scheme. In this case, when the UE intends to transmit eMBB service data requiring a large number of time/frequency resources to the base station, the UE transmits a scheduling request message to the base station through an uplink control channel. The base station having received the scheduling request message may transmit, to the corresponding UE, uplink scheduling DCI 1220 corresponding to scheduling grant. The base station may instruct the UE to transmit uplink data corresponding to an eMBB service through a PUSCH in several specific symbols based on the scheduling DCI 1220 (reference numeral 1201). In this case, when a situation occurs in which the UE is required to transmit grant-free-based uplink data corresponding to a URLLC service in a symbol having the same time index as the several specific symbols (reference numeral 1230), the UE does not transmit a part of eMBB data in a frequency band in which the UE has already transmitted the eMBB data in a scheduled resource, and may transmit the generated URLLC data in the frequency band. In this case, since there is a portion in which a part of the eMBB data that has been already scheduled and transmitted by the UE is not transmitted, the possibility of damage to the eMBB data is greatly increased. To solve the problem, the UE retransmits the portion in which a part of the eMBB data is not transmitted or retransmits the entire eMBB data, resulting in a loss of resources and time.

The above example describes a coexistence method between heterogeneous services that can transmit information according to each service when information according to eMBB and URLLC are scheduled by sharing a part of or the entire frequency band through NOMA, when information according to mMTC and URLLC are simultaneously scheduled, when information according to mMTC and eMBB are simultaneously scheduled, or when information according to eMBB, URLLC, and mMTC are simultaneously scheduled.

Figure 13:
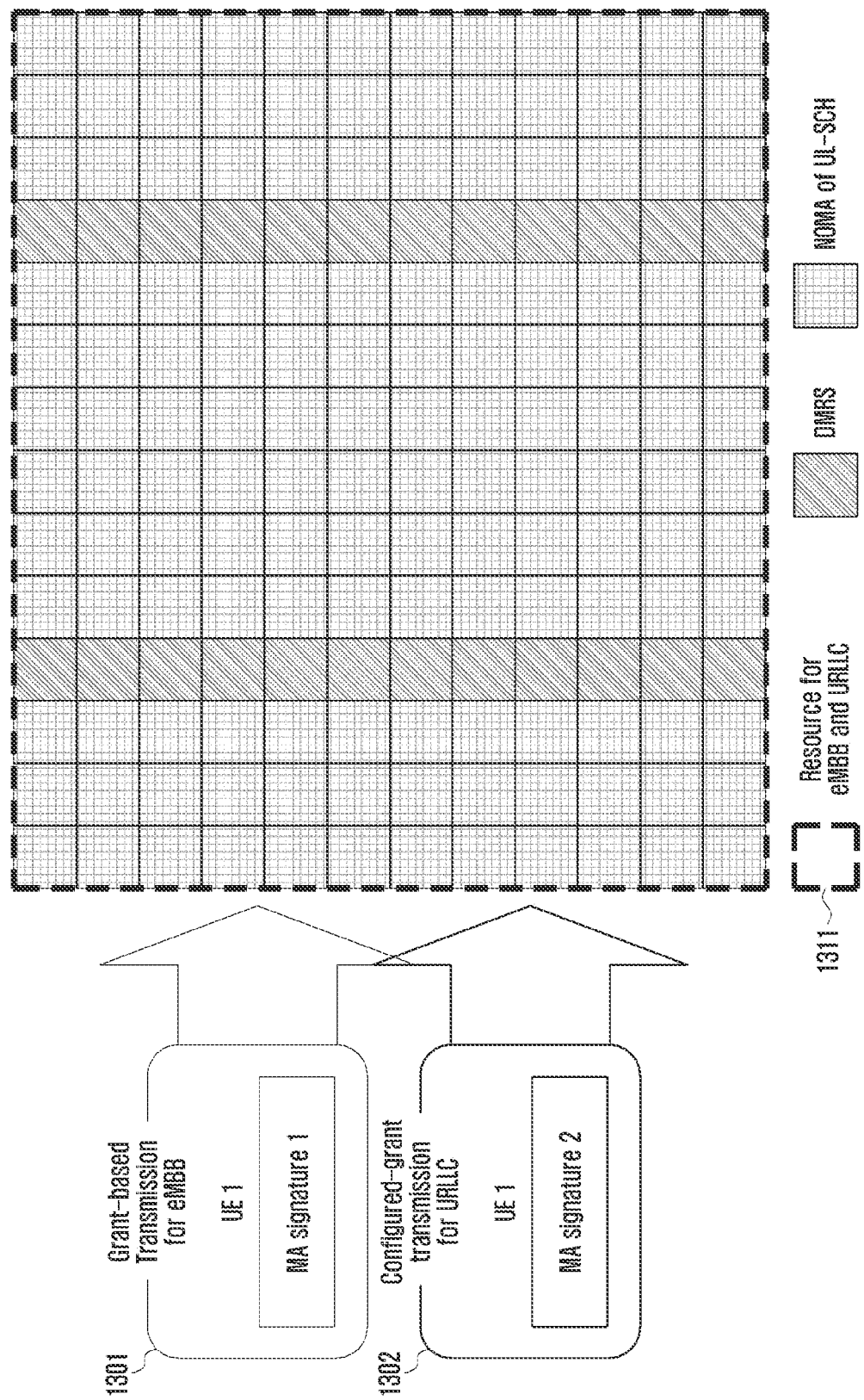
FIG. 13 illustrates a case in which one terminal transmits different service data in the same time and frequency resources according to the second embodiment of the disclosure.

As described above, a plurality of UEs may simultaneously transmit their PUSCHs in the same time and frequency resources through different MA signatures directly or indirectly received from the base station through the NOMA. This may be applied equally even in one UE. As shown in FIG. 13, one UE may simultaneously transmit multiple PUSCHs for different services (eMBB, URLLC, and mMTC) in the same time and frequency resources 1311 through different MA signatures 1301 and 1302 as described above. However, since it is not considered that one UE simultaneously transmits multiple PUSCHs in the same resource, one control information (for example, modulation and coding scheme (MCS) information, power information, etc.) is included in one PUSCH scheduling, and the following problem may occur.

It is considered that one PUSCH is to be transmitted when the base station first instructs the UE to perform scheduling in a grant-free-based PUSCH transmission scheme, so that modulation and coding scheme (MCS) information is determined. Thereafter, even when the base station instructs the UE to perform scheduling in a grant-based PUSCH transmission scheme, in the grant-free-based PUSCH transmission scheme, since the UE transmits a PUSCH directly without a grant of the base station in the configured time/frequency resource only when traffic to be transmitted to the base station occurs, the base station ensures transmission of multiple PUSCHs even in the grant-based PUSCH transmission scheme, so that modulation and coding scheme (MCS) information cannot be determined. In this case, when multiple PUSCHs are transmitted by one UE, since the base station has configured an MCS based on the case where one PUSCH is transmitted by the UE, if multiple PUSCHs are transmitted based on the same existing MCS, performance (reliability and the like) may decrease, and thus an MCS value may be required to be adjusted.

Accordingly, in an embodiment of the disclosure, the following methods may be considered as a method for selecting modulation and coding scheme (MCS) information when a UE transmits a plurality of PUSCHs through NOMA.

[Method 1]

As described above, a base station may explicitly indicate multiple MCS values in higher layer signaling (RRC signaling) or L1 signaling (DCI) for indicating a UE to perform scheduling in a grant-based PUSCH transmission scheme or a grant-free-based PUSCH transmission scheme. In this case, the UE may select MCS values for the grant-based PUSCH transmission scheme and the grant-free-based PUSCH transmission scheme, respectively, according to whether the UE simultaneously transmits one or multiple PUSCHs. For example, multiple MCS values are configured in RRC signaling or DCI, and the order of an MCS list may be determined corresponding to the number of PUSCH transmissions.

[Method 2]

A base station may configure PUSCH transmission in a UE through uplink scheduling DCI (for example, L1 signaling) or higher layer signaling (for example, radio resource control (RRC) signaling). In this case, when the base station provides an indication to the UE through physical signals (DCI) or a higher layer signal (for example, RRC signaling) such that multiple PUSCHs share a part of or the entire frequency band in symbols having the same time index and thus the UE simultaneously transmits multiple uplink data, the base station may explicitly provide an indication by including, in L1 signaling or higher layer signaling to be indicated later in time, an MCS value to a PUSCH previously scheduled and an MCS value related to a PUSCH indicated through the signaling. More specifically, since the base station is aware that the UE transmits only one PUSCH in symbols having the same time index in L1 signaling or higher layer signaling for initially indicating the UE to transmit uplink data, the base station may transmit one piece of MCS information. Then, since the base station is aware that the UE can transmit one or multiple PUSCHs in L1 signaling or higher layer signaling for additionally indicating the UE to transmit uplink data in a symbol having the same time index as the first PUSCH, not only MCS information of the additionally indicated PUSCH but also additional MCS information for the previous PUSCH may be included.

When MCS information to be applied to transmission of multiple PUSCHs is not included in DCI or RRC signaling to be additionally received later in time, the UE may use the previously scheduled MCS information for transmission of multiple PUSCHs.

[Method 3]

Based on information promised (or pre-configured) between a base station and a UE, the UE may calculate and select MCS values for a grant-based transmission scheme and a grant-free-based PUSCH transmission scheme, respectively, according to whether the UE simultaneously transmits one or multiple PUSCHs. For example, when it is necessary to transmit an additional PUSCH in the previously indicated MCS index, the UE calculates and selects an MCS index according to the number of simultaneously transmitted PUSCHs. When the number of simultaneously transmitted PUSCHs is two, the UE selects an index lower by one level from the MCS index indicated to each PUSCH. This may be expressed by the following equation.

$$i_{MCS,update,j} = \max(i_{mcs,j} - \alpha_j \cdot (N_- - 1), 0) \quad \text{[Equation 4]}$$

In the above equation, $i_{mcs,j}$ denotes an MCS index value indicated by the base station to the UE through L1 signaling or a higher layer signal, and $\alpha_j$ is a parameter indicating an MCS index conversion rate. $\alpha_j$ may be indicated by the base station to the UE, or may be a value previously promised to each other according to data service types (URLLC, eMBB, and mMTC) or grant-based or grant-free-based transmission. $N_{sim}$ denotes the total number of PUSCHs for transmitting multiple uplink data by sharing a part of or the entire frequency band in symbols having the same time index, and j denotes an index of each of the PUSCHs. Lastly, $i_{MSC,update,j}$ denotes an MCS index value which is changed according to the number of PUSCHs simultaneously transmitted by the UE. Through the above equation, the UE may transmit multiple PUSCHs simultaneously through NOMA by selecting an MCS index without adding or changing higher layer signaling or L1 signaling of the UE and the base station.

According to the second embodiment of the disclosure, the UE may modify the MCS in consideration of a performance reduction or an environmental change that may occur when transmitting multiple uplink data by sharing a part of or the entire frequency band in symbols having the same time index.

2-1-th Embodiment

As in the second embodiment, when one UE is instructed to transmit multiple uplink data by sharing a part of or the entire frequency band in symbols having the same time index through multiple higher layer signalings or L1 signalings, since each higher layer signaling or L1 signaling does not take into account that one UE simultaneously transmits a plurality of PUSCHs in the same resource and thus one power information is included in one PUSCH scheduling, the following problem occurs.

Power information is determined by considering that one PUSCH is to be transmitted in a case where a base station first instructs a UE to perform scheduling in a grant-free-based PUSCH transmission scheme. Thereafter, even in a case where the base station instructs the UE to perform scheduling in a grant-based PUSCH transmission scheme, in the grant-free-based PUSCH transmission scheme, the UE directly transmits a PUSCH without a grant of the base station in a configured time/frequency resource only when traffic to be transmitted to the base station occurs. Therefore, the base station cannot determine power information to ensure that a plurality of PUSCHs are transmitted even in the grant-based PUSCH transmission scheme. In this case, when the plurality of PUSCHs are transmitted by one UE, since the base station has configured power based on the case where one PUSCH is transmitted by the UE, if the plurality of PUSCHs are transmitted with the existing same power, the sum of the powers for the plurality of PUSCHs may exceed the maximum power which can be transmitted by one UE. Therefore, the UE is required to adjust power.

Traffic corresponding to a type of service having strict requirements (ultra-high reliability or ultra-low latency) such as URLLC may be processed with a higher priority than traffic corresponding to eMBB or mMTC in order to satisfy the corresponding requirements. That is, it is possible to satisfy the requirements for high-priority traffic by adjusting power from traffic having a low priority.

In the disclosure, traffic corresponding to a service requiring a relatively high priority is referred to as "first traffic", and traffic corresponding to a service having a relatively low priority is referred to as "second traffic". For example, URLLC may correspond to the first traffic, and eMBB or mMTC may correspond to the second traffic. Alternatively, under the determination of the base station, the first traffic and the second traffic may be separately notified of to the UE. If the UE can distinguish the first traffic and the second traffic in a physical layer, different priorities may be applied to transmission and reception of various physical layer channels such that a higher priority may be applied to the first traffic. Applying a higher priority may mean that power of the first traffic is fixed as indicated by the base station in simultaneously transmitting a data channel and a reference signal corresponding to the first traffic and the second traffic. In addition, the second traffic may be transmitted with less power compared to the remaining power excluding the power indicated for transmission of the first traffic from the power indicated for the second traffic and the maximum power that the UE can transmit. This may be expressed by the following equation.

$$P_{2,new} = \min(P_{max} - P_1, P_2) \quad \text{[Equation 5]}$$

In the above equation, $P_{max}$ denotes the maximum power that the UE can transmit, $P_1$ denotes power indicated for transmission of the first traffic having a high priority, and $P_2$ denotes power indicated for transmission of the second traffic having a low priority. Lastly, $P_{2,new}$ denotes the adjusted power for the transmission of the second traffic having a low priority.

Accordingly, it is important for the UE to recognize whether a channel that the UE desires to currently transmit or receive in a physical layer is a channel corresponding to the first traffic. According to the 2-1-th embodiment of the disclosure, the UE may distinguish the first traffic from other traffic by one or more of the following methods, or a combination thereof, and may fix the indicated power of the first traffic and adjust power of traffic having a low priority.

[Method 1]

DCI for scheduling a data channel corresponding to first traffic may be scrambled with a specific RNTI (for example, a C1-RNTI). A UE may receive the C1-RNTI from a base station, and may determine that a data channel scheduled by the DCI scrambled with the C1-RNTI corresponds to the first traffic.

[Method 2]

DCI for scheduling a data channel corresponding to first traffic may be defined in a specific format (for example, DCI format 0-2 for uplink or DCI format 1-2 for downlink). A UE may be notified of a configuration indicating monitoring of DCI format 0-2/1-2 from a base station, and may monitor the DCI format 0-2/1-2 according to the configuration. The UE may determine that a data channel scheduled in DCI format 0-2/1-2 corresponds to the first traffic.

[Method 3]

The type of search space in which DCI for scheduling a data channel corresponding to first traffic is monitored may be defined as a specific search space type (for example, USS1). A UE may receive a configuration of a search space having a search space type of USS1 from a base station, and determine that a data channel scheduled by DCI detected in the search space having the search space type corresponding to USS1 corresponds to the first traffic.

[Method 4]

A search space in which DCI for scheduling a data channel corresponding to first traffic is monitored may have a specific configuration (referred to as a first search space configuration). The first search space configuration may include, for example, at least one or a plurality of pieces of configuration information below.

Configuration information indicating that the interval between the closest monitoring occasions corresponds to X (symbols) or smaller
  Configuration information indicating that the number of monitoring occasions within a slot corresponds to Y or more
  Configuration information indicating that a search space ID (or index) is designated to a predefined specific value
  Configuration information indicating that first traffic or second traffic is explicitly configured by a configuration parameter within the search space A UE may receive a configuration of a search space having a first search space configuration from a base station, and determine that a data channel scheduled by DCI detected in the corresponding search space corresponds to first traffic.

[Method 5]

A control region in which DCI for scheduling a data channel corresponding to first traffic is monitored may have a specific configuration (referred to as a first control region configuration). The first control region configuration may include, for example, at least one or a plurality of pieces of configuration information below.

Configuration information indicating that a control region ID (or index) is designated to a predefined specific value
  Configuration information indicating that first traffic or second traffic is explicitly configured by a configuration parameter within the control region A UE may receive a configuration of a control region having a first control region configuration from a base station, and determine that a data channel scheduled by DCI detected in the corresponding search space corresponds to first traffic.

[Method 6]

A base station may pre-configure, in a UE, a specific bandwidth part (referred to as a first bandwidth part) in which a data channel corresponding to first traffic can be scheduled. The first bandwidth part may include, for example, at least one or a plurality of pieces of configuration information below.

Subcarrier spacing of the bandwidth part may be configured as a value larger than a predefined specific value (X).
  Configuration information indicating that a bandwidth part ID (or index) is designated to a predefined specific value
  Configuration information indicating that first traffic or second traffic is explicitly configured by a configuration parameter within the bandwidth part The UE may receive a configuration of the first bandwidth part from the base station, and determine that a data channel scheduled by DCI detected in the first bandwidth part, a data channel scheduled by the first bandwidth part, or a data channel scheduled by the first bandwidth part by the DC detected in the first bandwidth part corresponds to first traffic.

The UE may determine whether a data channel corresponds to first traffic through the above methods, and differentially assign a priority on the basis thereof. After the priority is assigned, the UE may fix the indicated power of the first traffic and adjust power of traffic having a low priority.

Figure 14:
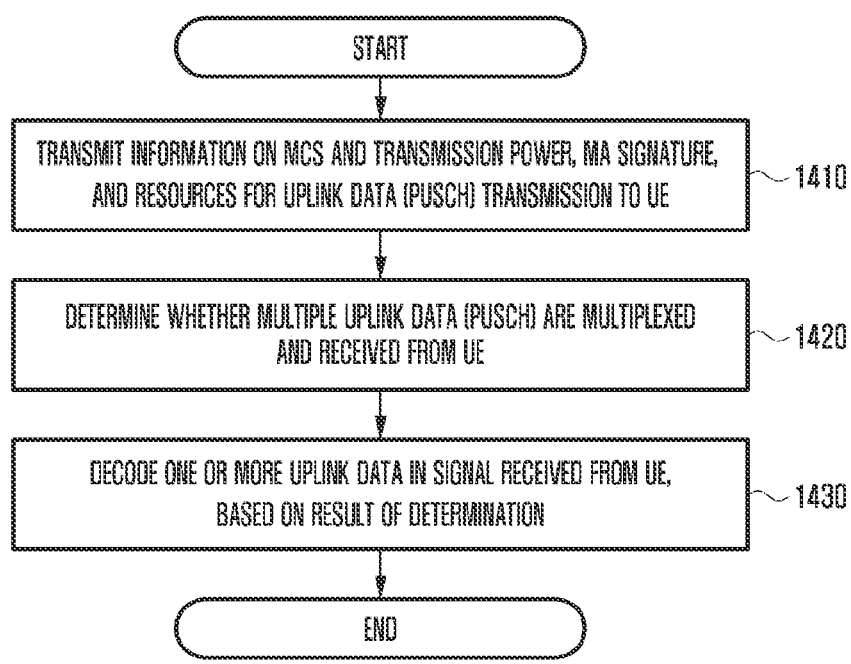
FIG. 14 is a flowchart illustrating an operation of a base station according to the second embodiment of the disclosure.

FIG. 14 is a flowchart illustrating an operation of a base station according to a second embodiment of the disclosure.

In operation 1410, a base station may transmit, to a UE, information on an MCS and a transmission power, an MA signature, and resources for uplink data (PUSCH) transmission. The information on the MCS and the transmission power may include information on an MCS and a transmission power determined as described in the second to 2-1-th embodiments described above.

In operation 1420, the base station may determine whether multiple uplink data (PUSCH) are multiplexed and received from the UE, through blind decoding. For example, the base station may determine whether each of the uplink data exists through blind decoding, based on each MA signature indicated in multiple uplink data scheduling information to the UE. However, this is only an example, and a method for determining whether multiple uplink data exists by a base station is not limited to the above-described example.

In operation 1430, the base station may decode at least one of the uplink data in a signal received from the UE, based on a result of the determination.

The operations of the base station according to the second and 2-1-th embodiments are not limited thereto, and may include all operations of the base station described in the second and 2-1-th embodiments.

Figure 15:
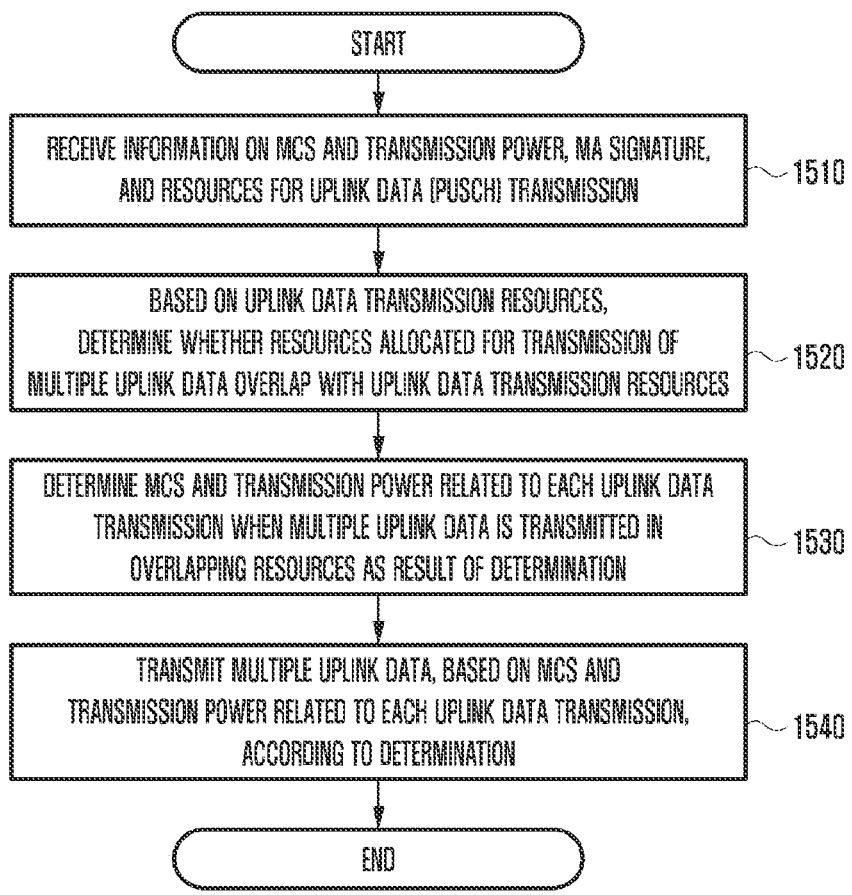
FIG. 15 is a flowchart illustrating an operation of a terminal according to the second embodiment of the disclosure.

FIG. 15 is a flowchart illustrating an operation of a UE according to a second embodiment of the disclosure.

In operation 1510, a UE may receive information on an MCS and a transmission power, an MA signature, and resources for uplink data (PUSCH) transmission. The information on the MCS and the transmission power may include information on an MCS and a transmission power determined as described in the second to 2-1-th embodiments described above, and may be determined based on information provided by the UE from a base station. In operation 1520, based on the uplink data transmission resources, the UE may determine whether resources allocated for transmission of multiple uplink data overlap with the uplink data transmission resources.

In operation 1530, when multiple uplink data is transmitted in overlapping resources as a result of the determination, the UE may determine an MCS and a transmission power related to each uplink data transmission. The above-described method in this specification may be used as a method for determining an MCS and a transmission power related to each uplink data transmission by a UE.

In operation 1540, the UE may transmit multiple uplink data, based on the MCS and the transmission power related to each uplink data transmission according to the determination.

The operations of the UE according to the second and 2-1-th embodiments are not limited thereto, and may include all operations of the UE described in the second and 2-1-th embodiments.

Figure 16:
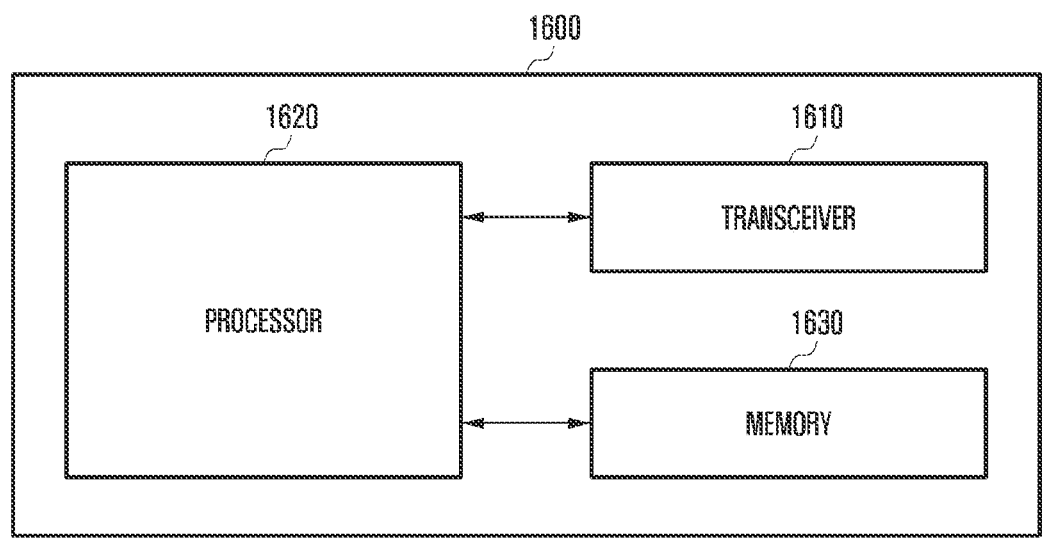
FIG. 16 illustrates a configuration of a terminal according to the disclosure.

FIG. 16 illustrates a configuration of a UE 1600 according to the disclosure.

Referring to FIG. 16, a UE 1600 may include a transceiver 1610, a processor 1620, and a memory 1630. The transceiver 1610, the processor 1620, and the memory 1630 of the UE 1600 may be operated according to a downlink control information transmission method and a grant-free-based uplink data channel transmission method for supporting non-orthogonal multiple access (NOMA) in a 5G communication system corresponding to the above-described embodiment. However, components of the UE 1600 according to an embodiment are not limited to the above-described example. According to another embodiment, the UE 1600 may include more or fewer components than the above-described components. In addition, in a specific case, the transceiver 1610, the processor 1620, and the memory 1630 may be implemented in the form of a single chip.

The transceiver 1610 may be configured by a transmitter and a receiver according to another embodiment. The transceiver 1610 may transmit or receive a signal to or from a base station. The signal may include control information and data. To this end, the transceiver 1610 may include an RF transmitter which up-converts and amplifies a frequency of a transmitted signal, an RF receiver which amplifies a received signal with low noise and down-converts a frequency of the signal, and the like. In addition, the transceiver 1610 may receive a signal through a wireless channel, output the signal to the processor 1620, and transmit the signal output from the processor 1620 through the wireless channel.

The processor 1620 may control a series of processes in which the UE 1600 can operate according to the above-described embodiment of the disclosure. For example, the processor 1620 may differently control a grant-free-based transmission method for non-orthogonal multiple access according to an embodiment of the disclosure, that is, a method for transmitting uplink data to a part of a grant-free transmission resource, a method for transmitting uplink control information, a method for transmitting DMRS, or the like. In addition, the processor 1620 may control to receive an RRC release message including a configuration related to a radio resource control (RRC) inactive, identify a transmission resource for data transmission, based on an RRC connection resume request, transmit data and a random access preamble, based on the transmission resource, and receive a random access response corresponding to the random access preamble. The transmission resource may be determined based on first information included in the configuration related to the RRC inactive and second information related to resource identification. The first information may correspond to an inactive-radio network temporary identifier (I-RNTI) included in the configuration related to the RRC inactive. The second information may be determined based on at least one of the number of resources in which data can be transmitted in a random access procedure, the number of preambles per random access channel (RACH) occasion, the total number of preambles, and the number of synchronization signal blocks (SSBs). In addition, the second information may be obtained through system information when the UE is in an RRC inactive state. In addition, the processor 1620 may control to obtain multiple access (MA) signature information, based on the first information, and the data may be transmitted based on the MA signature information.

The memory 1630 may store control information or data, such as information on MA signature configuration included in a signal obtained from the UE 1600, and may have a region for storing data required for control of the processor 1620 and data generated during control of the processor 1620.

Figure 17:
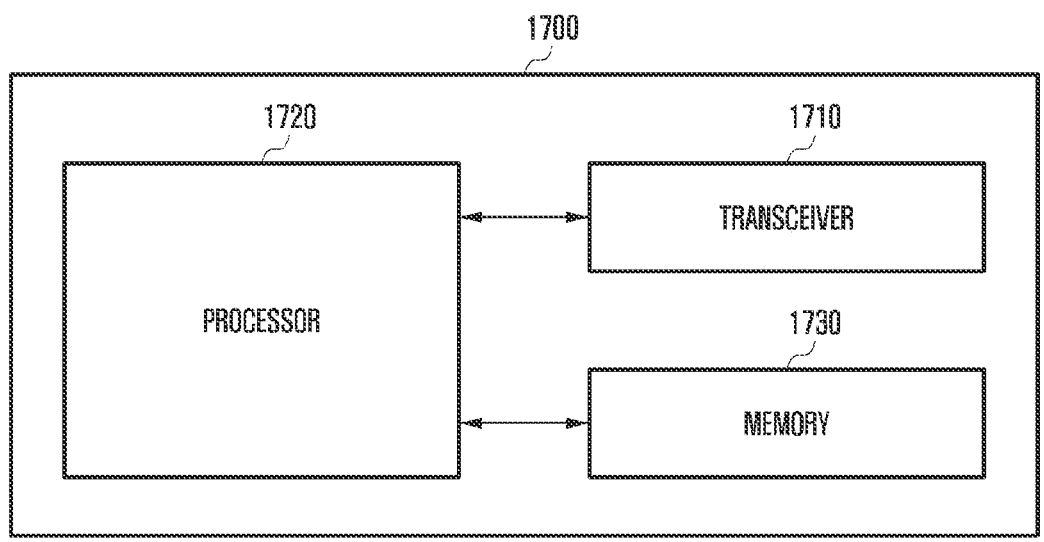
FIG. 17 illustrates a configuration of a base station according to the disclosure.

FIG. 17 illustrates a configuration of a base station 1700 according to the disclosure.

Referring to FIG. 17, a base station 1700 may include a transceiver 1710, a processor 1720, and a memory 1730. The transceiver 1710, the processor 1720, and the memory 1730 of the base station 1700 may be operated according to a downlink control information transmission method and a grant-free-based uplink data channel transmission method for supporting non-orthogonal multiple access (NOMA) in a 5G communication system corresponding to the above-described embodiment. However, components of the base station 1700 according to an embodiment are not limited to the above-described example. According to another embodiment, the base station 1700 may include more or fewer components than the above-described components. In addition, in a specific case, the transceiver 1710, the processor 1720, and the memory 1730 may be implemented in the form of a single chip. The transceiver 1710 may be configured by a transmitter and a receiver according to another embodiment. The transceiver 1710 may transmit or receive a signal to or from a UE. The signal may include control information and data. To this end, the transceiver 1710 may include an RF transmitter which up-converts and amplifies a frequency of a transmitted signal, an RF receiver which amplifies a received signal with low noise and down-converts a frequency of the signal, and the like. In addition, the transceiver 1710 may receive a signal through a wireless channel, output the signal to the processor 1720, and transmit the signal output from the processor 1720 through the wireless channel.

The processor 1720 may control a series of processes in which the base station 1700 can operate according to the above-described embodiment of the disclosure. For example, the processor 1720 may differently control a grant-free-based transmission method for non-orthogonal multiple access according to an embodiment of the disclosure, a method for configuring a grant-free-based transmission resource, a method for monitoring and receiving uplink data to a part of a grant-free transmission resource, a method for receiving uplink control information, a method for transmitting DMRS, and the like. In addition, the processor 1720 may control to receive a random access preamble and data from the UE, and transmit a random access response to the UE, based on the reception of the random access preamble. The transmission resource for transmission of the data may be included in the configuration related to the RRC inactive of a radio resource control (RRC) release message. In addition, the processor 1720 may transmit an RRC release message to the UE, and the RRC release message may include the configuration related to the RRC inactive, and an I-RNTI. The first information may correspond to an inactive-radio network temporary identifier (I-RNTI) included in the configuration related to the RRC inactive. In addition, the second information may be determined based on at least one of the number of resources in which data can be transmitted in a random access procedure, the number of preambles per random access channel (RACH) occasion, the total number of preambles, and the number of synchronization signal blocks (SSBs), and the second information may be included in system information transmitted by the base station.

The memory 1730 may store control information and data, such as information on MA signature configuration determined by the base station 1700, or control information and data received from the UE, and may have a region for storing data required for control of the processor 1720 and data generated during control of the processor 1720.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary.

The invention claimed is:

1. A method of a terminal, the method comprising:
receiving a radio resource control (RRC) release message comprising a configuration related to an RRC inactive;
identifying a transmission resource for data transmission, based on an RRC connection resume request;
transmitting data and a random access preamble, based on the transmission resource; and
receiving a random access response corresponding to the random access preamble,
wherein the transmission resource is determined based on an inactive-radio network temporary identifier (I-RNTI) included in the configuration related to the RRC inactive and information related to resource identification.

2. The nmethod of claim 1, wherein the information is determined based on at least one of a number of resources in which data can be transmitted in a random access procedure, a number of preambles per random access channel (RACH) occasion, a total number of preambles, or a number of synchronization signal blocks (SSBs), and
wherein the information is received by the terminal through system information in an RRC inactive state.

3. The method of claim 1, wherein the transmission resource corresponds to multiple access (MA) signature information determined based on the I-RNTI, and
wherein the data is transmitted based on the MA signature information.

4. A terminal comprising:
a transceiver; and
a controller connected to the transceiver and configured to control to receive a radio resource control (RRC) release message comprising a configuration related to an RRC inactive, identify a transmission resource for data transmission, based on an RRC connection resume request, transmit data and a random access preamble, based on the transmission resource, and receive a random access response corresponding to the random access preamble,
wherein the transmission resource is determined based on an inactive-radio network temporary identifier (I-RNTI) included in the configuration related to the RRC inactive and information related to resource identification.

5. The terminal of claim 4, wherein the information is determined based on at least one of a number of resources in which data can be transmitted in a random access procedure, a number of preambles per random access channel (RACH) occasion, a total number of preambles, or a number of synchronization signal blocks (SSBs), and
wherein the information is received by the terminal through system information in an RRC inactive state.

6. The terminal of claim 4, wherein the transmission resource corresponds to multiple access (MA) signature information determined based on the I-RNTI, and
wherein the data is transmitted based on the MA signature information.

7. A method of a base station, the method comprising:
receiving a random access preamble and data from a terminal; and
transmitting a random access response to the terminal, based on the reception of the random access preamble,
wherein a transmission resource for transmission of the data is determined based on an inactive-radio network temporary identifier (I-RNTI) included in a configuration related to a radio resource control (RRC) inactive of an RRC release message and information related to resource identification.

8. The method of claim 7, wherein the information is determined based on at least one of a number of resources in which data can be transmitted in a random access procedure, a number of preambles per random access channel (RACH) occasion, a total number of preambles, or a number of synchronization signal blocks (SSBs), and
wherein the information is included in system information transmitted by the base station.

9. The method of claim 7, wherein the transmission resource corresponds to multiple access (MA) signature information determined based on the I-RNTI.

10. A base station comprising:
a transceiver; and
a controller connected to the transceiver and configured to control to receive a random access preamble and data from a terminal, and transmit a random access response to the terminal, based on the reception of the random access preamble,
wherein a transmission resource for transmission of the data is determined based on an inactive-radio network temporary identifier (I-RNTI) included in a configuration related to a radio resource control (RRC) inactive of an RRC release message and information related to resource identification.

11. The base station of claim 10, wherein the transmission resource corresponds to multiple access (MA) signature information determined based on the I-RNTI.

12. The base station of claim 10, wherein the information is determined based on at least one of a number of resources in which data can be transmitted in a random access procedure, a number of preambles per random access channel (RACH) occasion, a total number of preambles, or a number of synchronization signal blocks (SSBs), and wherein the information is included in system information transmitted by the base station.

* * * * *